US010268266B2

(12) United States Patent
Mathey-Owens et al.

(10) Patent No.: US 10,268,266 B2
(45) Date of Patent: Apr. 23, 2019

(54) SELECTION OF OBJECTS IN THREE-DIMENSIONAL SPACE

(71) Applicant: Microsoft Technology Licensing, LLC, Redmond, WA (US)

(72) Inventors: Cheyne Rory Quin Mathey-Owens, Seattle, WA (US); Arthur Tomlin, Kirkland, WA (US); Marcus Ghaly, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 108 days.

(21) Appl. No.: 15/197,484

(22) Filed: Jun. 29, 2016

(65) Prior Publication Data

US 2018/0004283 A1    Jan. 4, 2018

(51) Int. Cl.
*G06F 3/01* (2006.01)
*G06F 3/0484* (2013.01)
*G06F 3/0481* (2013.01)
*G06F 3/0482* (2013.01)
(Continued)

(52) U.S. Cl.
CPC .............. *G06F 3/013* (2013.01); *G06F 3/011* (2013.01); *G06F 3/017* (2013.01); *G06F 3/0482* (2013.01); *G06F 3/04815* (2013.01); *G06F 3/04842* (2013.01); *G06T 7/0061* (2013.01); *G06T 7/0071* (2013.01); *G06T 7/0083* (2013.01); *G06T 19/006* (2013.01)

(58) Field of Classification Search
None
See application file for complete search history.

(56) References Cited

U.S. PATENT DOCUMENTS

| 7,348,997 | B1 | 3/2008 | Croft |
| 7,646,394 | B1 | 1/2010 | Neely, III et al. |
| 9,003,333 | B2 | 4/2015 | Ho |

(Continued)

FOREIGN PATENT DOCUMENTS

| TW | 201411409 A | 3/2014 |
| WO | 20140126966 A1 | 8/2014 |

OTHER PUBLICATIONS

Chatterjee et al., "Gaze+Gesture: Expressive, Precise and Targeted Free-Space Interactions," In Proceedings of the ACM on International Conference on Multimodal Interaction, Published Date Nov. 9, 2015, 8 pages.

(Continued)

*Primary Examiner* — Gustavo D Polo
(74) *Attorney, Agent, or Firm* — Jacob P. Rohwer; Newport IP, LLC

(57) ABSTRACT

A user may select or interact with objects in a scene using gaze tracking and movement tracking. In some examples, the scene may comprise a virtual reality scene or a mixed reality scene. A user may move an input object in an environment and be facing in a direction towards the movement of the input object. A computing device may use sensors to obtain movement data corresponding to the movement of the input object, and gaze tracking data including to a location of eyes of the user. One or more modules of the computing device may use the movement data and gaze tracking data to determine a three-dimensional selection space in the scene. In some examples, objects included in the three-dimensional selection space may be selected or otherwise interacted with.

17 Claims, 20 Drawing Sheets

(51) Int. Cl.
    *G06T 7/00*         (2017.01)
    *G06T 19/00*       (2011.01)

(56) References Cited

U.S. PATENT DOCUMENTS

| | | |
|---|---|---|
| 9,116,666 B2 | 8/2015 | Salter |
| 2003/0142144 A1 | 7/2003 | Balakrishnan |
| 2005/0108620 A1 | 5/2005 | Allyn et al. |
| 2007/0146325 A1 | 6/2007 | Poston et al. |
| 2009/0110235 A1 | 4/2009 | Marti |
| 2013/0293468 A1* | 11/2013 | Perez .................. G06F 3/033 345/158 |
| 2013/0321403 A1 | 12/2013 | Piemonte et al. |
| 2014/0300547 A1 | 10/2014 | Hosenpud et al. |
| 2014/0372957 A1 | 12/2014 | Keane et al. |
| 2015/0135132 A1 | 5/2015 | Josephson |
| 2015/0205494 A1 | 7/2015 | Scott et al. |
| 2016/0189426 A1* | 6/2016 | Thomas .............. G06T 19/006 345/633 |

OTHER PUBLICATIONS

Lucas, III, "Design and Evaluation of 3D Multiple Object Selection Techniques," In Master's Thesis of Faculty of the Virginia Polytechnic Institute and State University, Published Date Jan. 2005, 87 pages.

Valenti et al., "Combining Head Pose and Eye Location Information for Gaze Estimation," Proceedings of IEEE Transactions on Image Processing, vol. 21, issue 2, Published Date Feb. 2012, 14 pages.

PCT/US2017/036939—International Search Report and Written Opinion, dated Jul. 18, 2017, 17 pages.

* cited by examiner

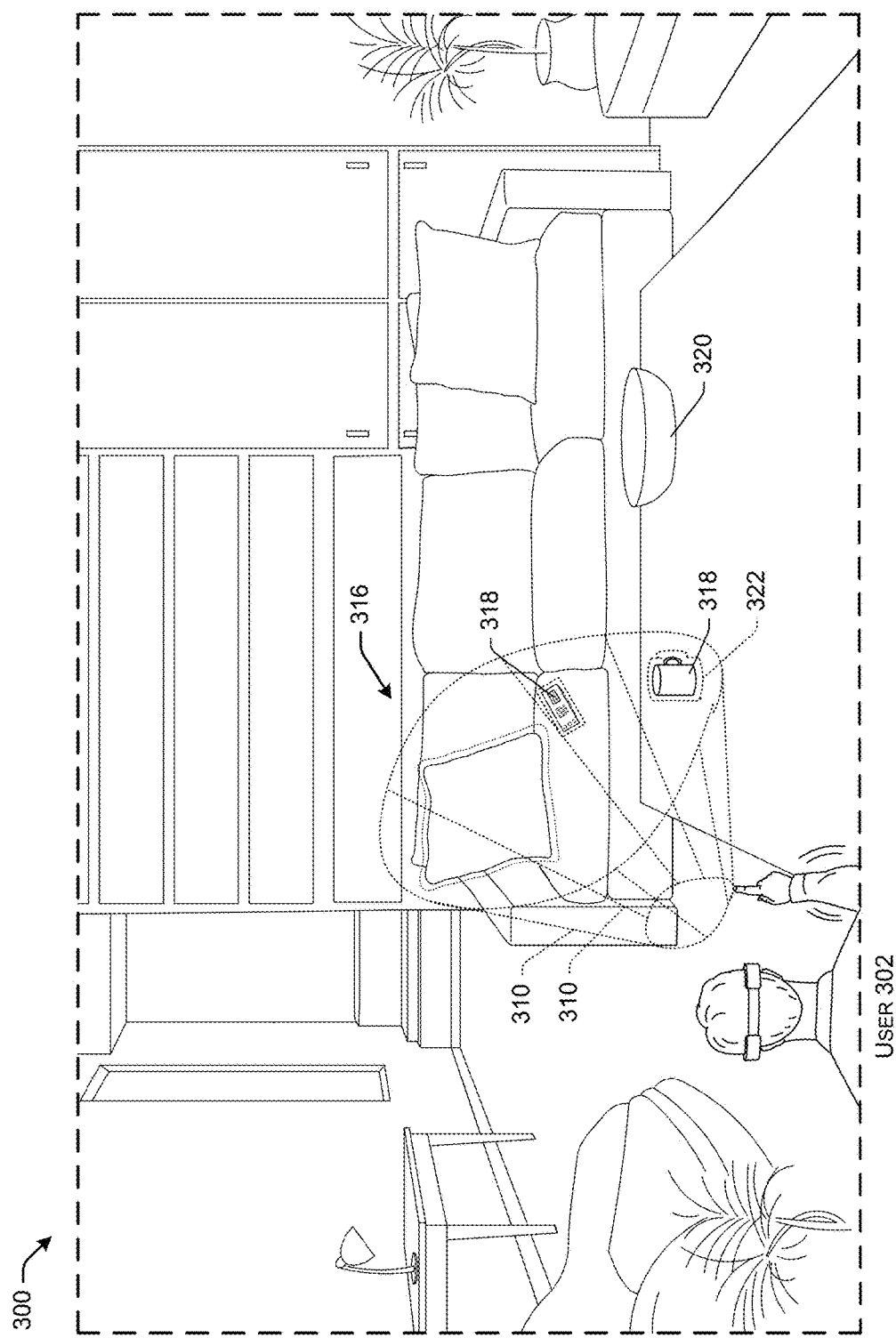

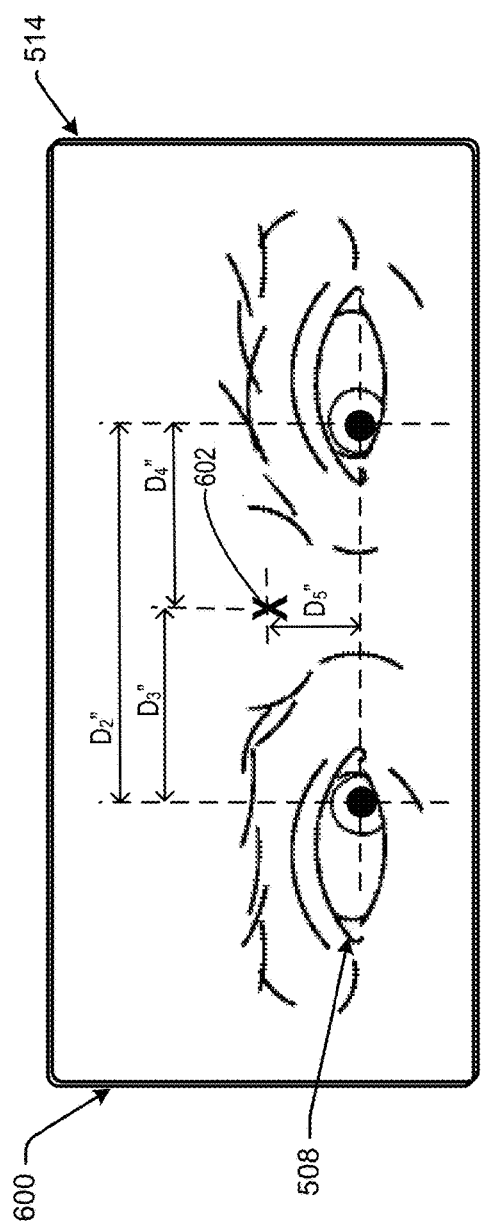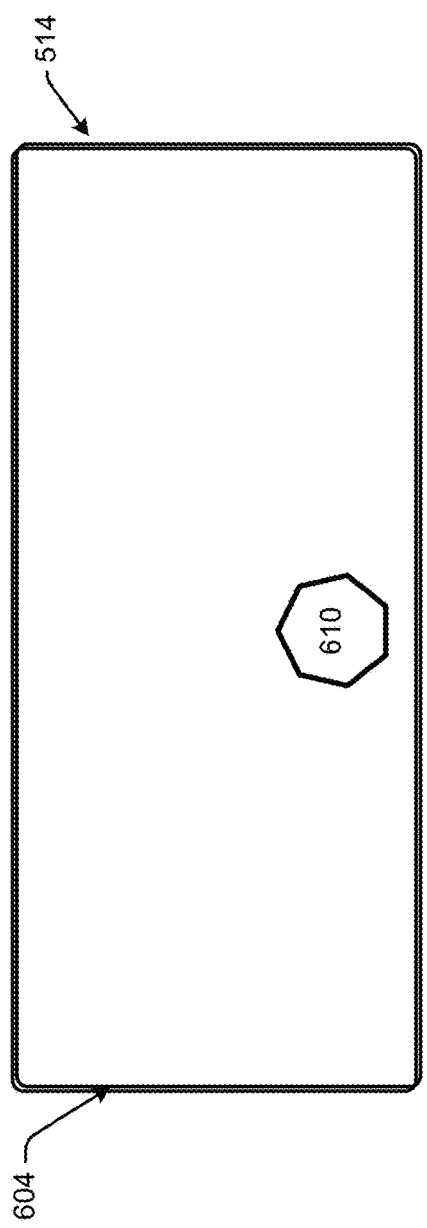

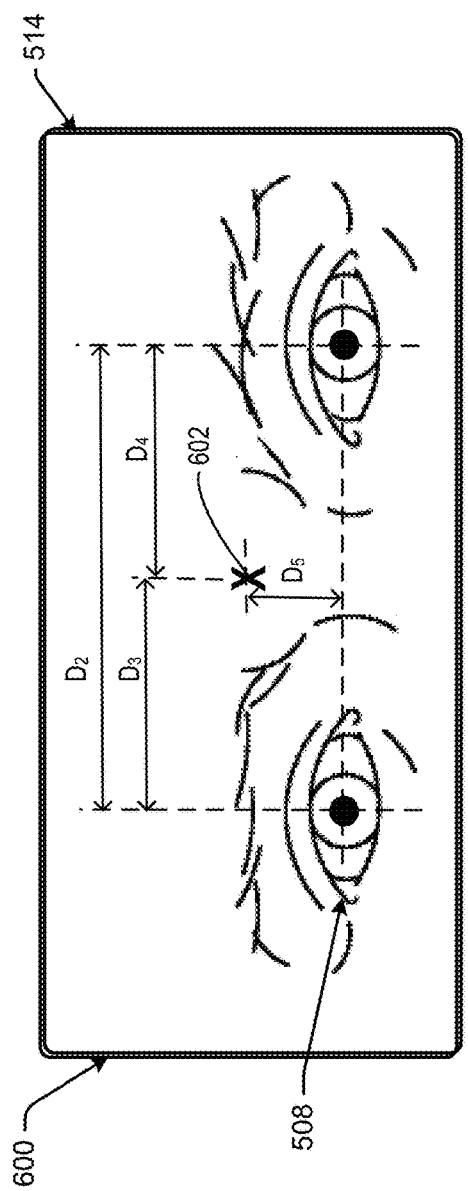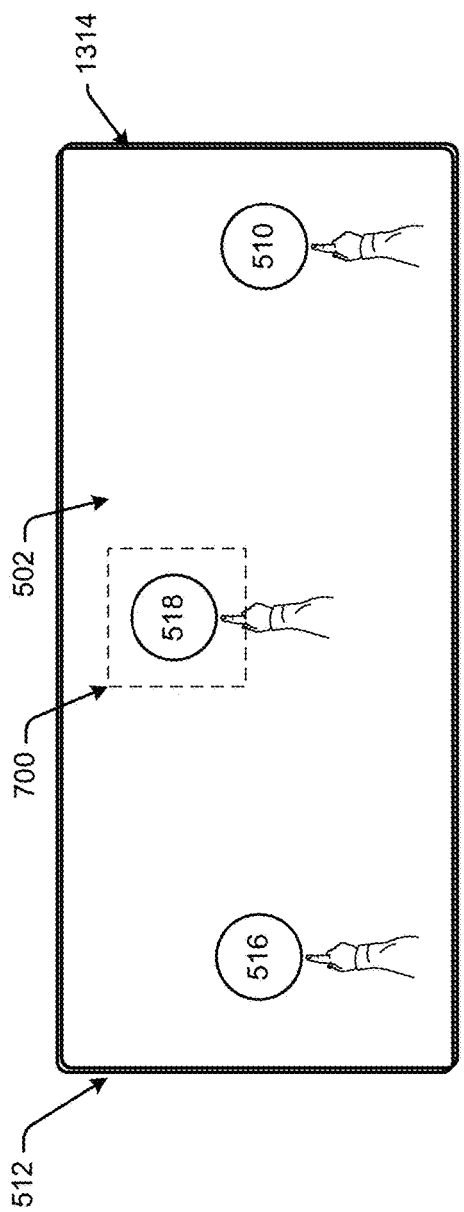

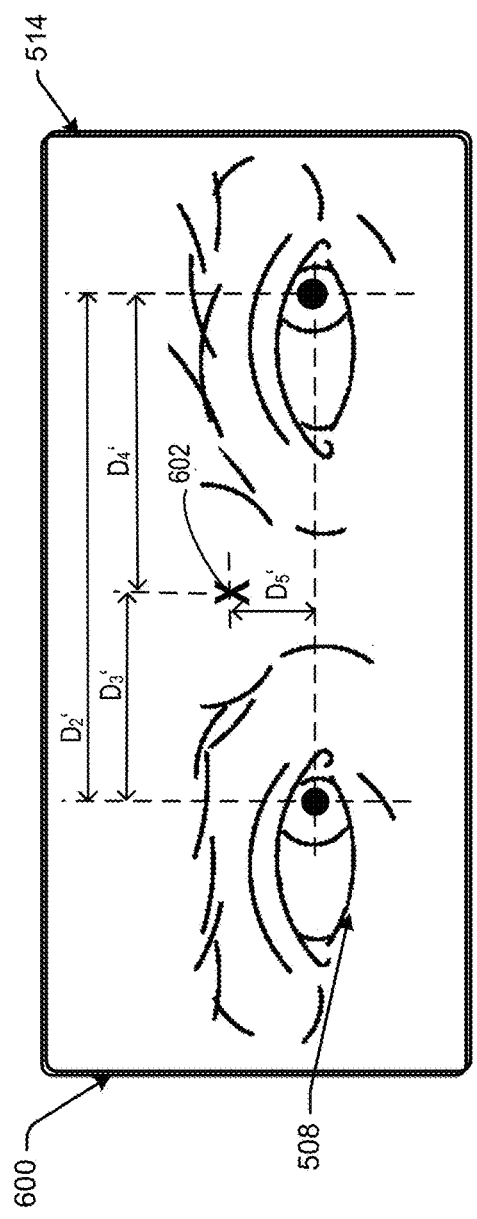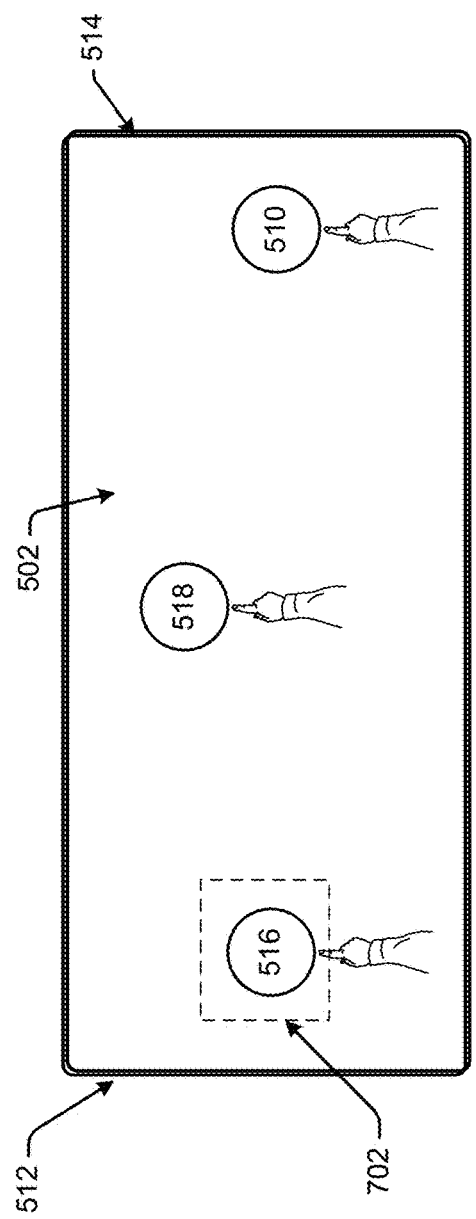

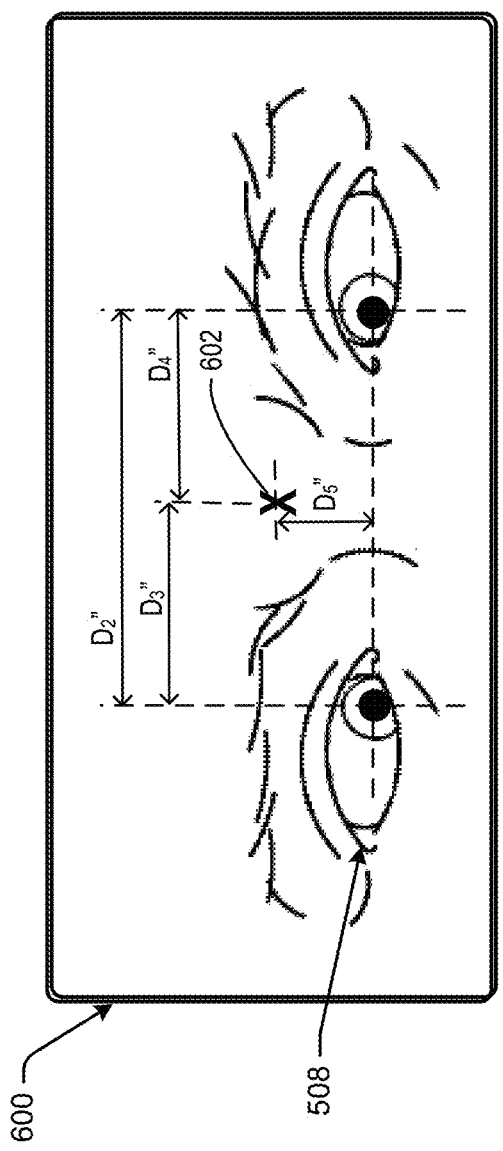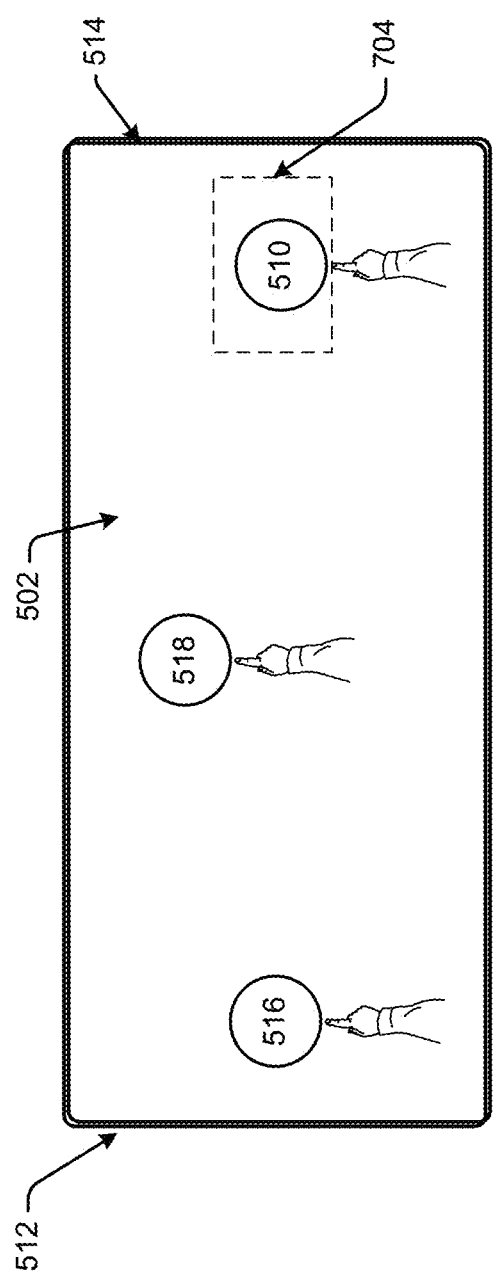

SELECTION OF OBJECTS IN THREE-DIMENSIONAL SPACE

BACKGROUND

Computing devices can be used to generate and interact with three-dimensional scenes, including virtual reality scenes and/or mixed reality scenes. Virtual reality is an immersive experience, which simulates physical space in a projected or displayed scene. Mixed reality, also known as augmented reality, is a hybrid reality experience, which merges real worlds and virtual worlds by presenting virtual objects in a physical environment to provide a mixed reality scene. In virtual and mixed reality scenes such as these, computing devices can enable users to interact with physical objects and virtual objects. For example, a user may interact with objects in the scene by performing a virtual selection of the object and performing an action on the object (e.g., painting an object, resizing an object, moving an object, etc.). In some instances, a user may wish to perform the same action on multiple objects in the scene. Existing solutions for selecting objects (physical and/or virtual objects) in virtual reality and/or mixed reality scenes are inadequate and cumbersome.

SUMMARY

This disclosure describes techniques for selection of one or more objects in virtual and/or mixed reality scenes.

In some examples, one or more objects (e.g., physical objects and/or virtual objects) may be present in a scene (i.e., virtual reality or mixed reality scene) with which a user wishes to interact. A computing device may track the movement of an input object (e.g., hand, finger, stylus, six-degrees of freedom control, etc.) controlled by the user through the environment using sensors. In some examples, the user may perform a starting action (e.g., pressing a button, hand gesture, pinching gesture, etc.) using the input object which indicates the user wishes to perform an operation (e.g., selection) with the one or more objects in the scene. The computing device may use sensors to track the movement of the input object subsequent to the starting action until an ending action is detected (e.g., pressing a button, releasing a button, another hand gesture, etc.). Additionally, the computing device may obtain tracking data using sensors to track the location of the eyes of the user relative to the input object as the user moves the input object in the environment. By tracking the movement of the input object and the location of the eyes of the user during movement of the input object, the computing device may identify a shape informed by the user's movement of the input object. As described herein, an environment of the user is a physical, or real-world environment which includes physical objects. A scene is either a virtual scene where only virtual objects are presented (e.g., presented on a display) and the physical environment is excluded, or a mixed reality scene where virtual objects are presented within or as a part of the physical environment.

In various examples, the computing device may extend and/or expand the shape in the scene in a direction substantially parallel to a vector that starts at or near eyes of the user and extends to a location along the shape, such as the center of the shape (i.e., center vector), to create a three-dimensional (3D) selection space. For example, the computing device may calculate vectors originating at or near the eye of the user that intersect with points along the shape defined by the movement of the input object. Although the vectors are defined as starting at a location near or at eyes of the user, they may originate at another point in the scene or environment. The vectors may include vectors which pass through points of the shape, such as points where the starting action and ending actions were detected. The computing system may use these vectors to extend the shape defined by the movement of the input object in the environment in a direction substantially parallel to the center vector to create a 3D volume in the scene. That is, the 3D volume created is the space that is located in between the vectors that are extended in the direction substantially parallel to the center vector in a direction away from the eyes of the user and through the shape. In some examples, objects that are located within, or at least partially within, this 3D volume, or selection space, may be interacted with (i.e., selected). In some examples, an object must lie entirely within the 3D volume to be selected, while in other examples, various thresholds may be set or determined to also select objects that only have a portion included in the 3D volume.

The selection techniques described herein provide a fast and easy way of selecting multiple objects in a three-dimensional space, without the need for individual selection of objects. In some examples, the selection techniques may require less time and computing resources to select and/or perform actions on multiple objects. For example, rather than processing inputs for multiple selections and/or actions performed on each of multiple objects individually, the techniques described herein may result in less processing power by reducing the amount of inputs and actions processed by a computing device to perform the same selections and/or actions on the multiple objects. Thus, in some instances, use of the selection techniques described herein may reduce processing and time requirements to select and/or perform actions on multiple objects. While the techniques are described herein the context of a virtual reality or mixed reality scene, in other examples the techniques can be applied to other contexts, e.g., a computer with a camera, game console with a camera, vehicle display, etc.

This Summary is provided to introduce a selection of concepts in a simplified form that are further described below in the Detailed Description. This Summary is not intended to identify key or essential features of the claimed subject matter, nor is it intended to be used to limit the scope of the claimed subject matter.

BRIEF DESCRIPTION OF THE DRAWINGS

The Detailed Description is set forth with reference to the accompanying figures, in which the left-most digit of a reference number identifies the figure in which the reference number first appears. The use of the same reference numbers in the same or different figures indicates similar or identical items or features.

FIG. 3A and FIG. 3B illustrate an example process for selecting multiple objects in a scene using another movement of an input object and gaze tracking data.

FIG. 6A-FIG. 6F describe example techniques for obtaining calibration data for gaze tracking.

FIG. 7A-FIG. 7F describe example techniques for processing calibration data and other data to identify a gaze target.

DETAILED DESCRIPTION

Figure 1:
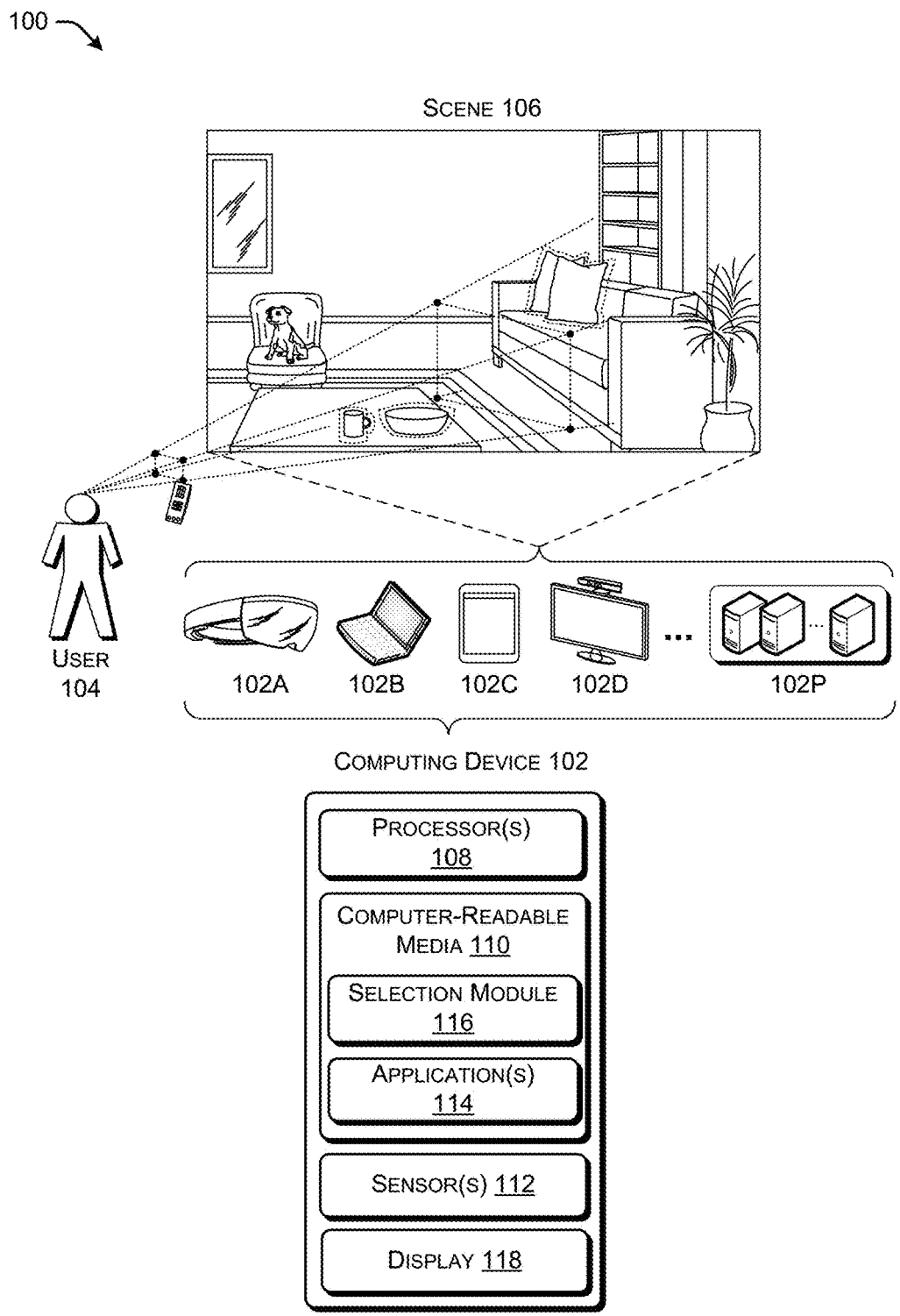
FIG. 1 is a schematic diagram showing an example environment for enabling selection of multiple objects using a computing device.

As discussed above, computing devices can help users interact with virtual and/or physical objects in virtual and/or mixed reality scenes. For example, a user may interact with an object in these scenes by virtually selecting the object and/or performing an action on the object (e.g., resizing, moving, painting, etc.). In some instances, a user may wish to select and/or interact with multiple objects substantially simultaneously, sequentially, and/or in a batch. However, existing object selection techniques become burdensome and time-consuming when multiple objects are involved. For example, existing techniques require a user to select and interact with one object at a time, which becomes burdensome and time-consuming when multiple objects must be selected and interacted with individually.

This disclosure describes selection techniques for selection of one or more objects in a 3D scene using gaze tracking and movement tracking. In some examples, multiple objects (i.e., physical objects and/or virtual objects) may be present and/or projected in a scene. A user may wish to select or interact with the multiple objects as a group. A computing device may use movement sensors (e.g., environment camera, accelerometer, depth sensing cameras, magnetic field sensors, etc.) to obtain movement data by tracking the movement of an input object (e.g., hand, finger, stylus, remote control, etc.) controlled by the user through the environment. In some examples, the computing device may detect a starting action (e.g., pressing a button, hand gesture, voice command, etc.) performed by the user which indicates the user wishes to select or otherwise interact with one or more objects in the scene. The computing device may further use the movement sensors to track the movement of the input object subsequent to the starting action until the movement stops, or until an ending action is detected. Additionally, the computing device may use gaze sensors (e.g., infrared ("IR") emitters and sensors, visible light sensors, depth sensing cameras, accelerometers, proximity sensors, cameras, etc.) to obtain gaze tracking data by tracking a position of eyes of the user relative to the input object, or by detecting and tracking the gaze of the user as the user moves the input object in the environment. As defined herein, gaze tracking data may include data collected by gaze tracking sensors, such as a position of eyes of the user relative to the input object, or a gaze (i.e., line of sight) of the user. The vector calculation techniques are described herein as calculating the vectors by determining an originating location for the vectors at or near the users eyes relative to a point in the environment, such as the input object, using gaze tracking sensors (e.g., user-facing environmental cameras, outwardly facing environmental cameras, accelerometers, proximity sensors, magnetic field sensor, etc.). However, in some examples the vector calculation techniques may include calculating the vectors using gaze tracking sensors which identify a gaze of the user in the environment, as described in more detail with respect to FIGS. 4-8, to identify where the user is looking and defining the vectors based on the gaze of the user.

In various examples, the computing device may use the movement data and gaze tracking data obtained from tracking the movement of the input object and the location of the eyes of the user during the movement of the input object to determine a two-dimensional (2D) or 3D shape formed by the movement of the input object. For example, the computing device may calculate vectors originating at or near an eye of the user that intersect with points along the shape (e.g., x and y coordinates in the case of 2D shapes, or x, y, and z coordinates in the case of 3D shapes) defined by the movement of the input object. The points of the shape through which the vectors pass may be points in space corresponding to where the starting action and ending action were detected. In some examples, the movement may be a diagonal line, and the shape may be a rectangle that has a diagonal corresponding to the diagonal line. In other examples, the shape may be defined by a movement of the input object in a circle shape, spherical shape, a free form bounded shape or "lasso," or any other shape.

As noted above, in some examples the location of the eyes of the user may be tracked and vectors (i.e., gaze vectors) originating at or near the user's eyes which intersect with points along the shape may be calculated. In such examples, the computing system may use these vectors to extend and/or expand a virtual representation of the shape defined by the movement of the input object in a direction substantially parallel to a vector that starts at or near the eyes of the user and extends to a position on the shape, such as a center of the shape, to create a virtual 3D selection space or volume in the scene. As an example, the shape may be extended and expanded similar to how light is extended from a flash light or headlight on a car. In such examples, the shape may be expanded such that geometrically/mathematically similar shapes, but larger or expanded, define the shape at distances further away from the user.

In some examples, the vectors and the 3D selection space created by the vectors may be created and/or calculated as the movement is detected and obtained. For example, as the user moves the input object, the vectors and 3D selection space may be calculated and gradually expanded as the movement continues. In various examples, a display may present a virtual representation of the vectors and/or 3D selection space to apprise the user of the shape of the 3D selection space and/or the objects currently lying completely in, or partially in (e.g., any part of the object, more than half of the object, etc.), the 3D selection space. In some examples, objects that fall within or partially within the 3D selection space may be highlighted or otherwise indicated as being included in the 3D selection space as the movement continues and the 3D selection space expands. Thus, the user may visualize or preview what objects currently lie within or move into the 3D selection space as the movement is detected.

In some examples, the shape may be extended and/or expanded in a direction parallel to a gaze vector that starts at or near eyes of the user and extends to any position on the shape, such as the center of the shape, for an infinite distance (i.e., a distance or location at which the sensors of the computing device can no longer measure). In other examples, a finite 3D volume may be calculated by determining maximum and minimum distances from the user at which to "cut" or bound the 3D volume. For example, the 3D volume may be bound by cutting the 3D volume with a plane perpendicular to the vector that starts at or near eyes of the user and extends to the center of the shape at a maximum distance (i.e., far boundary) and/or minimum distance (i.e., near boundary) from the user to create a finite 3D volume (e.g., cone, frustum, cylinder, etc.). In some examples, the maximum and minimum distances may be predetermined distances at which to cut the 3D volume. For instance, the maximum and minimum distances may be arbitrary and reconfigurable distances away from the user (e.g., 1 foot, 2 feet, 10 feet, 15 feet, etc.). In other instances, the maximum and minimum distances may be determined or set by actions of the user. For example, the user may move the input object towards or away from the user's body to set the minimum and/or maximum distances before the user moves the input object to define the cross-sectional shape, as the user moves the input object to define the cross-sectional shape, or after the user moves the input object to define the cross-sectional shape. In various examples, the user may use the arm that is not moving the input object to define the depth by moving their arm towards or away from their body, or the user may move their body forward or backwards relative to the input object to define the minimum and maximum distances from the user to create the finite 3D volume. In some examples, the movement of the input object, alternate arm, and/or body may be multiplied by a scaling factor (e.g., 2×, 5×, etc.) when using that movement to calculate the minimum and maximum distances. That is, a relatively small movement of the input object, alternate arm, or body may result in a longer increase/decrease in size of the 3D selection space.

In some examples, turning the user's head or moving the user's head relative to the input object moves the selection space in the scene (e.g., similar to the beam of a flash light). In this way, the user may change the angle or direction of the selection space in the scene by moving their head or turning their head relative to the input object.

The computing device may use the 3D volume as a 3D selection space where all objects included in, or at least partially included in, the 3D selection space are selected or otherwise acted upon. For example, all of the objects that fall within or at least partially within the shape that has been extended and/or expanded along the direction parallel to the vector that starts at or near the eyes of the user and extends to the center of the shape to create the 3D selection space may be selected or otherwise interacted with. In some examples, the objects that fall within or at least partially within the 3D selection space may have one or more virtual indicators associated with them to apprise the user which objects are selected. For example, the objects within or at least partially within the 3D selection space may be highlighted, outlined, colored, or have a visible indicator (e.g., number, arrow, etc.) positioned near them, or any other indicator usable to indicate that the objects have been selected. The indicators may be presented in response to detecting an end of the movement of the input object that defines the shape, or in response to detecting the ending action.

In some examples, multiple gestures or movements of the input object may be used to identify objects that are included or at least partially included in the 3D selection space. For example, an initial group of objects may be selected as they fall within or at least partially within a 3D selection space formed by a first movement of the input object using the techniques described herein. A second movement of the input object may then be detected subsequent to selecting the initial group of objects which selects a subgroup of the objects located within or at least partially within the 3D selection space. In this way, multiple gestures may be used to select groups and subgroups within those groups which are interacted with. Thus, a user may define a first selection space and wish to interact with a subgroup within this selection space without having to redefine the first selection space.

In some examples, objects may be "locked" or otherwise prevented from being interacted with. For instance, objects in the scene may be predefined objects that are unable to be interacted with or selected. When these objects fall within or at least partially within a selection space, they may be prevented from being selected or interacted with. In this way, a user or system may create "anchor" objects, or objects which are prevented from being interacted with or selected to allow a user to interact with objects around the anchor objects without having to deselect objects they wish to remain static.

In various examples, the completed 3D selection space and selected objects may be fixed in space and allow further interaction by the user. For example, the user may walk or look around the objects and the 3D selection space in the scene and perform various operations, such as deselecting one or more objects that were selected, or moving objects into and out from the 3D selection space.

Thus, the techniques described herein allow a user to create a virtual 3D selection space defined from the user's point of view to select multiple objects by defining a shape which encompasses the objects when vectors representative of the user's viewpoint, gaze, or line of sight are used to extend and/or expand the image in a direction parallel to a vector that starts at or near eyes of the user and extends to a center location of the shape.

In some examples, the selection techniques described herein may be implemented in whole or in part using a head-mounted computing device (e.g., Occulus Rift® by Occulus VR, Google Glass by Google Inc., or HoloLens by Microsoft Corporation) having a gaze tracking camera. The head-mounted computing device may also include a display and/or an environmental camera (e.g., user facing environmental camera, outward facing environment camera, etc.) to capture the surroundings or environment of a user. When the user desires to use the head-mounted display or other computing resource accessible via the head-mounted display, the user may simply gaze at a scene displayed by the head-mounted display device, a real-world scene of his or her real-world surroundings, or at a mixed reality scene, the user's gaze may be tracked by the gaze tracking camera. In other examples, the selection techniques described herein may be implemented using a personal computer (e.g., laptop or desktop) having a user-facing web camera to capture the user's eye location, gaze, and movements. In other examples, the selection techniques described herein may be implemented using a game console or other computing device in communication with a depth camera as a user input (e.g., Kinect® by Microsoft Corporation, PlayStation®Camera by Sony Corporation). In some examples, the selection techniques described herein may be implemented using a display in a vehicle having a user-facing camera to capture the user's eye location, gaze, and movements.

While certain specific examples are described involving various hardware and software configurations, the techniques described herein are not limited to those examples and may be implemented using any computing device or combination of computing devices capable of tracking a gaze or eye location of a user while the user looks at a scene. Examples of other computing devices that are usable to implement the techniques described herein include, without limitation desktop computers, laptop computers, tablet computers, mobile devices, smartphones, wearable computers, implanted computing devices, telecommunication devices, automotive computers, network enabled televisions, thin clients, terminals, game consoles, gaming devices, work stations, media players, digital video recorders (DVRs), set-top boxes, cameras, access points to a building or other facility, integrated components for inclusion in a computing device, appliances, or any other sort of computing device including or having access to a camera or other sensor capable of tracking gaze and/or eye location of a user.

While the subject matter described herein is primarily presented in the general context of techniques for selecting multiple objects in an environment or scene, the techniques described herein may apply to any type of action on one or more objects, such as resizing, moving, coloring, etc. Additionally, although the techniques described herein are with reference to selecting multiple objects, the techniques are also usable for selecting individual objects in a scene.

The selection techniques described herein provide a fast and easy way of selecting multiple objects in a three-dimensional space, without the need for individual selection of objects. In some examples, the selection techniques may require less time and computing resources to select and/or perform actions on multiple objects. For example, rather than processing inputs for multiple selections and/or actions performed on each of multiple objects individually, the techniques described herein may result in less processing power by reducing the amount of inputs and actions processed by a computing device to perform the same selections and/or actions on the multiple objects. Thus, in some instances, use of the selection techniques described herein may reduce processing and time requirements to select and/or perform actions on multiple objects.

These and various other example features will be apparent from a reading of the following description and a review of the associated drawings. However, the claimed subject matter is not limited to implementations that solve any or all disadvantages or provide any of the benefits noted in any part of this disclosure.

Example Environments

FIG. 1 is a schematic diagram showing an example environment 100 in which multiple object selection techniques can be implemented. The example environment 100 can include one or more computing devices 102 usable by the user 104 to select multiple objects presented in a scene 106. Example computing device(s) 102 illustrated in this figure include a head-mounted computing device 102A, a laptop computer 102B, a tablet computer 102C, a gaming device 102D, and a distributed computing environment 102P. However, as discussed above, the techniques described herein can also be implemented using any other computing device including or having access to a camera or other sensor capable of tracking a location of eyes and movement of a user.

In this example, the user 104 is attempting to virtually select multiple objects in the scene 106. The environment 100 may comprise a physical, or real world, environment. As noted above, the scene 106 may be a computer generated scene, a real-world scene, or a mixed reality scene. For example, the scene may include the real world environment and one or more virtual objects. Additionally, or alternatively, the scene may be a virtual reality scene excluding the physical, real world environment. The user may move an input object in the scene 106 to define a shape. For example, the user may perform a starting action, perform a selection movement or gesture, and perform an ending gesture. As described above, the computing device 102 may include sensors to obtain data, such as gaze tracking data and movement data.

The computing device 102 can include one or more processing unit(s) (e.g., processor(s) 108), computer-readable media 110 such as memory, and one or more sensors 112 (e.g., a gaze tracking camera, an environmental camera, accelerometers, proximity sensors, magnetic field sensors, etc.). The computer-readable media 110 may include one or more applications 114, such as an operating system, a browser, or the like. The computing device 102 may capture gaze tracking data and movement data using the sensor(s) 112 or other sensor of the computing device 102 while the user 104 performs the movement to define the shape. For example, the computing device 102 may use sensor(s) 112, such as a proximity sensor, to determine to location of the eyes of the user relative to an input object in the environment. In another example, the sensors(s) 112 may comprise environmental cameras or gaze tracking cameras which identify a location of the eyes of the user relative to an input object in an environment. The gaze tracking data may include data indicating a location of the user's eyes in the environment 100 relative to a point, such as an input object. In some examples, the computer-readable media 110 includes a selection module 116 which analyzes the gaze tracking data and movement data. For example, the selection module 116 may analyze the gaze tracking data and movement data and calculate or determine a shape defined by the movement of the input object, calculate vectors originating at or near an eye of the user 104 and passing through points along the shape, and use the vectors to extend and/or expand the shape in a direction parallel to a vector that starts and or near eyes of the user 104 and extends to the center of the shape. In this way, the selection module 116 may define a 3D selection space. In some examples, the computing device 102 may further include a display 118. The display 118 may present or display virtual objects in the scene. For instance, the display may display virtual objects in the real world environment 100, or in a virtual reality environment. The selection module 116 may identify objects, such as virtual objects presented by the display 118 or physical objects in the environment 100, included in the 3D selection space and select the objects, which may include associating an indicator with the selected objects. In this way, the computing device 102 may facilitate selection of objects in a virtual or mixed reality scene 106.

Example Selection Techniques

FIGS. 2A-3B illustrate example selection processes in the context of various different example computer generated, real-world, and mixed reality scenes.

Figure 2A:
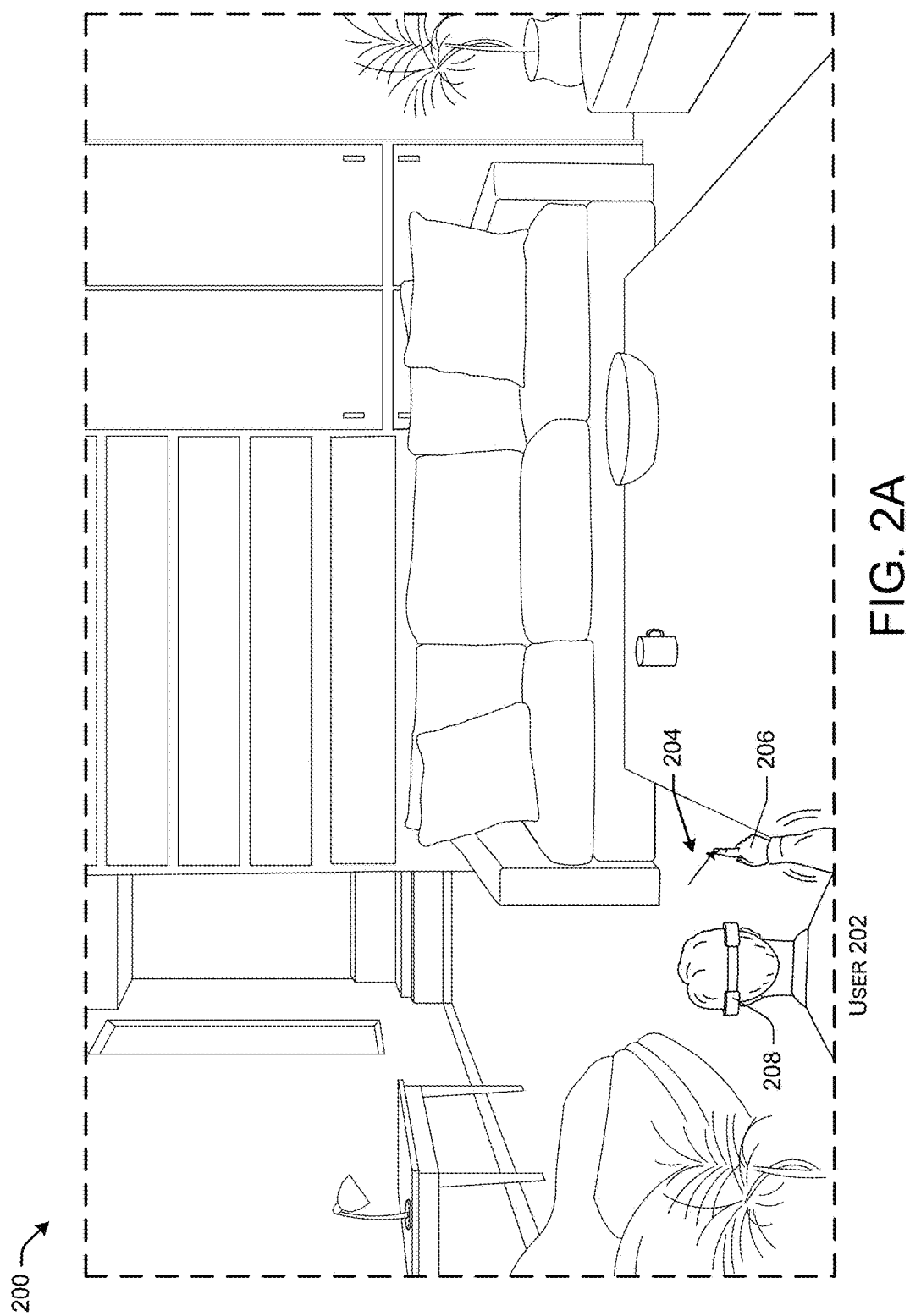
FIG. 2A-FIG. 2D illustrate an example process for selecting multiple objects in a scene using a movement of an input object and gaze tracking data.

FIGS. 2A-2D illustrate an example process for selecting objects in a scene 200 using a movement of an input object and gaze tracking data. As discussed above, the scene 200 may include a physical real world environment along with virtual objects presented by a display, or the scene may be entirely virtual reality objects presented by a display. As shown in FIG. 2A, a user 202 may make a movement 204 (i.e., gesture) using an input object 206 (i.e., hand, finger, six-degrees of freedom control, etc.) in the scene 200. While the movement 204 is illustrated as a diagonal line, the movement 204 may be any type of movement usable to select objects in the scene 200.

In some examples, the user 202 may wear or otherwise be associated with a computing device 208, such as computing device 102. Although illustrated as a wearable computing device, computing device 208 may comprise any type of computing device usable to track movements and a location of eyes of the user 202. The computing device 208 may include sensors (i.e., sensor(s) 112) to obtain movement data corresponding to the movement 204 of the input object 206. Additionally, the computing device 208 may further include sensors (i.e., sensor(s) 112) to obtain gaze tracking data corresponding to a location at or near the eyes of the user 202.

Figure 2B:
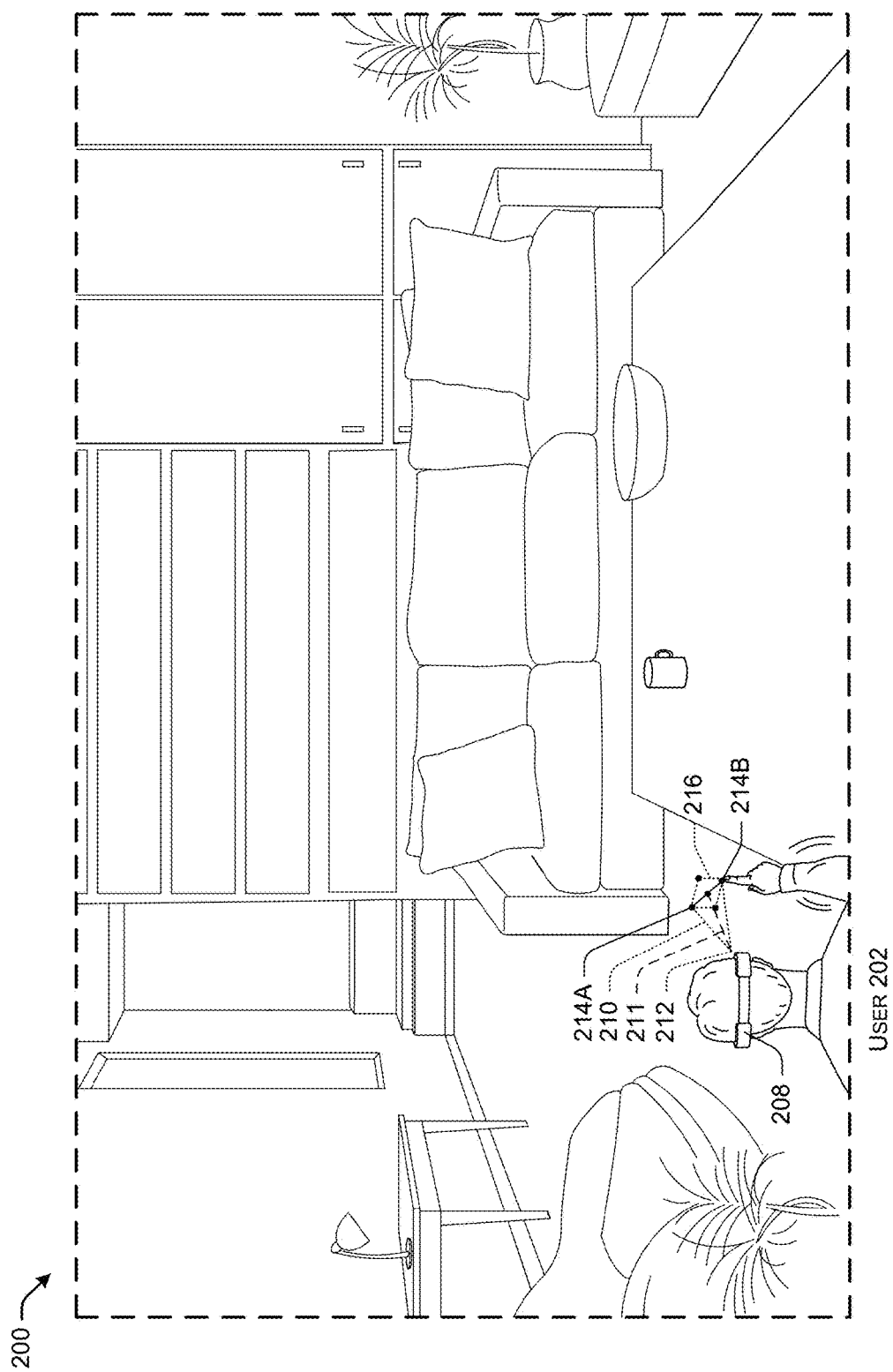

FIG. 2B illustrates techniques for determining one or more gaze vectors 210 based on the movement data and gaze tracking data obtained by the computing device 208. For example, the computing device 208 may include one or more modules, such as selection module 116, configured to calculate the gaze vector(s) 210 originating at an origin point 212 and intersecting with one or more points 214 (i.e., point 214A and 214B) along a shape 216 defined by the movement 204 of the input object 206. For example, the gaze vector(s) 210 may originate at origin point 212 and pass through the point(s) 214 along the shape 216. In some examples, the gaze vector(s) 210 may be calculated or determined using the gaze tracking data and/or the movement data. For instance, the selection module 116 may analyze the gaze tracking data to identify a location of eyes of the user 202 in an environment relative to a point, such as the input object 206, and analyze the movement data to determine the point(s) 214 along the shape that the user 202 is facing as the movement 204 of the input object 206 is performed. In various examples, the locations of the point(s) 214 may be determined by analyzing the movement data and calculating 3D locations (e.g., x1, y1, z1) of the points in space. The 3D locations of the point(s) 214 may be calculated with respect to the origin point 212, which may be defined as the origin (i.e., x0, y0, z0) of a grid defining the scene 200. In some examples, the selection module 116 may further analyze the movement data and the gaze tracking data to identify a center gaze vector 211 which extends from a location near or at the eyes of the user, such as origin point 212, and extends to a point defined by the shape 216, such as a center point.

In various examples, the movement 204 may define a shape 216. For example, as shown in FIG. 2A and FIG. 2B, the movement 204 may be a diagonal line, which is used as a diagonal for a rectangle shape 216 calculated based on the diagonal line. Thus, the movement 204 may define the shape 216 in the scene 200. However, in other examples, such as the example of FIG. 3A and FIG. 3B, the movement 204 may define a perimeter of the shape 216.

Figure 2C:
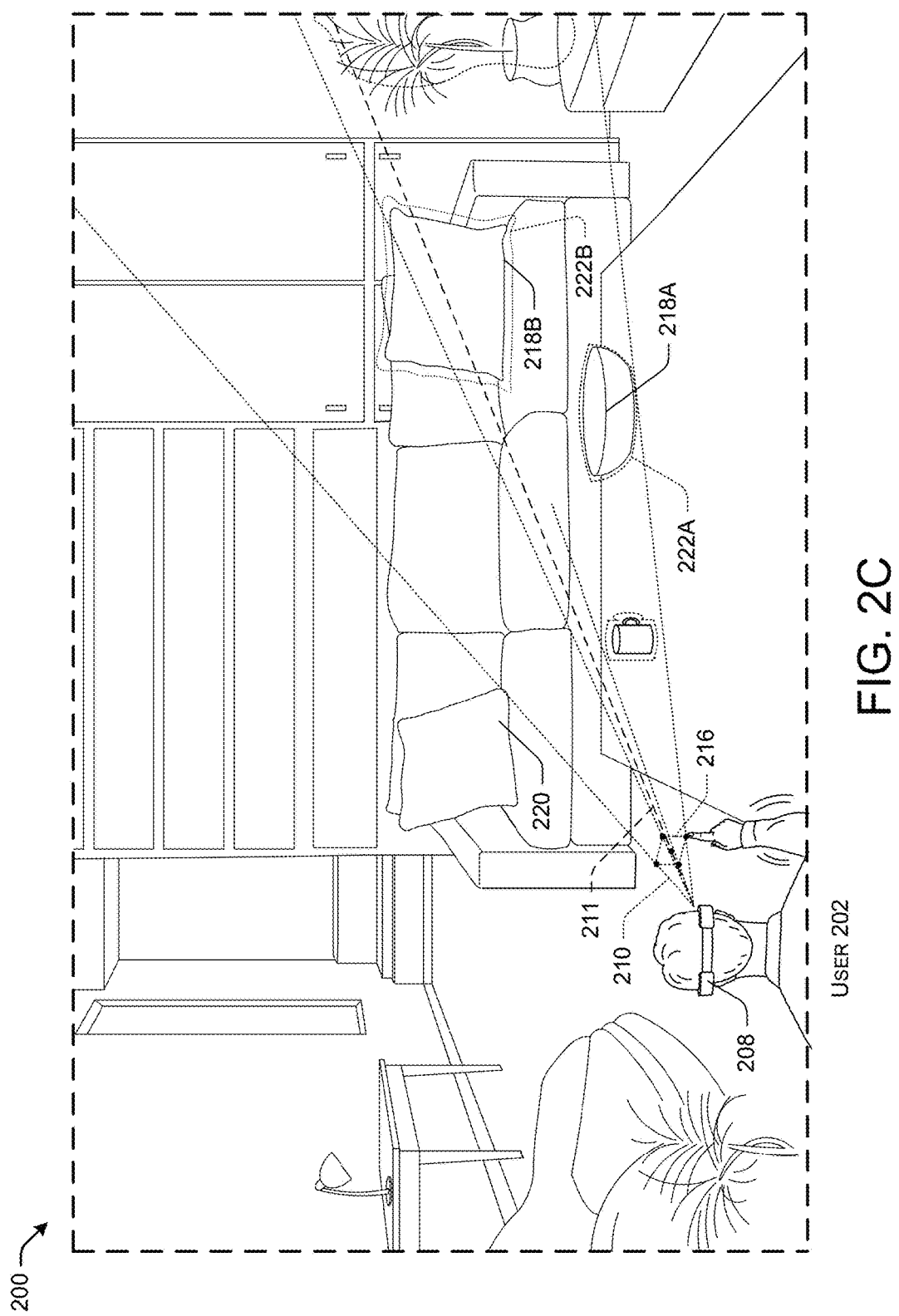

FIG. 2C illustrates techniques for extending the shape 216 using gaze vector(s) 210 in the scene 200. For example, the selection module 116 may extend the shape 216 by extending the gaze vector(s) 210 in a direction parallel to the center gaze vector 211 for an infinite distance (i.e., an infinite distance, a distance or location at which the sensors of the computing device can no longer measure, or until an object blocks the vectors from extending). In this way, the shape 216 may be extended to create a 3D volume, or 3D selection space.

In some examples, the scene 200 may include multiple object(s) 218, such as objects 218A and 218B. The objects 218 may be real, physical objects, or virtual objects projected into the scene by the computing device 208. The object(s) 218 which fall within, or at least partially within (i.e., more than a threshold amount), the 3D selection space, such as objects 218A and 218B, may be selected, while objects that fall outside, or at least partially outside (i.e., more than a threshold amount), the 3D selection space, such as object 220, remain unselected. In various examples, the computing device 208 may project one or more virtual indicators 222, such as indicators 222A and 222B, to indicate the objects 218A and 218B as being selected. While the indicator(s) 222 are represented as a dotted line around the object(s) 218, the indicator(s) 222 may be highlighting the selected object(s) 218, a color change in the object(s) 218, an icon (e.g., arrow, number, etc.) placed nearby the selected object(s) 218, or any other visible indicator to show the object(s) 218 as being selected. In this way, the user 202 may be apprised of which objects in the scene are selected, or otherwise included in the 3D selection space.

Figure 2D:
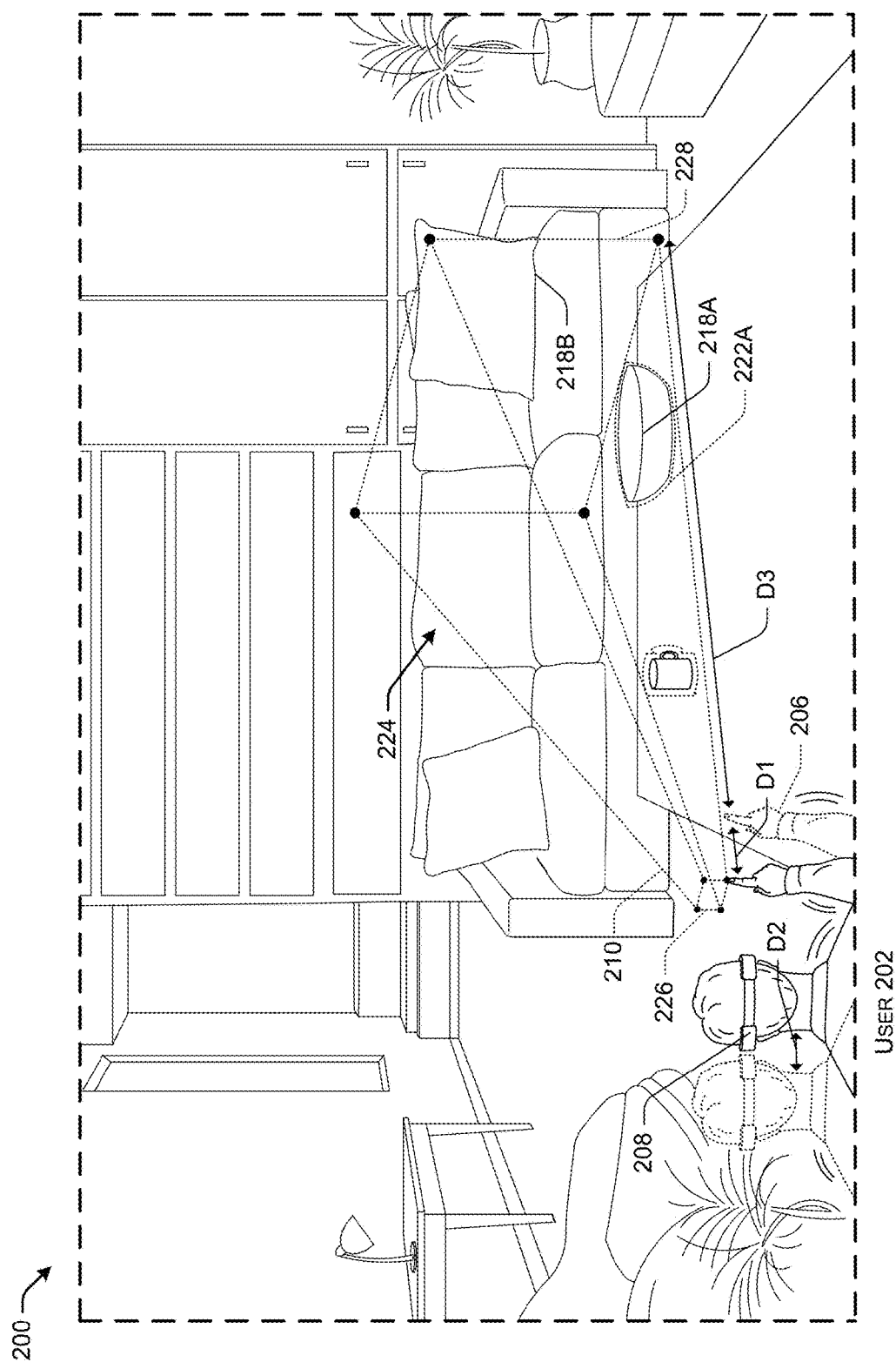

FIG. 2D illustrates techniques for creating a finite 3D selection space 224. For example, the selection module 116 may determine or calculate a maximum and/or minimum distance from the user 202 at which to "cut" the 3D selection space. For example, the 3D selection space may be bound by cutting the 3D selection space with a plane perpendicular to the center gaze vector 211 at a maximum distance 228 (i.e., far boundary) and/or minimum distance 226 (i.e., near boundary) from the user 202 to create a finite 3D selection space 224 (e.g., cone, frustum, cylinder, etc.).

In some examples, the maximum distance 228 and/or the minimum distance 226 may be predetermined distances at which cut the 3D volume. For instance, the maximum distance 228 and minimum distance 226 may be predetermined and reconfigurable distances away from the user (e.g., 1 foot, 2 feet, 10 feet, 15 feet, etc.). In other instances, the maximum distance 228 and minimum distance 226 may be determined or set by actions of the user 202. For example, the user may move the input object 206 a distance D1 towards or away from the user's body, or move the body or head of the user a distance D2 relative to the input object 206, to set the maximum distance 228 before the user moves the input object 206 to define the shape 216, as the user 202 moves the input object 206 to define the shape 216, or after the user 202 moves the input object 206 to define the shape 216. In various examples, the user 202 may use the arm that is not moving the input object 206 to define the depth by moving their arm towards or away from their body, or the user may move their body forward or backwards (as shown in FIG. 2D) to define the minimum and maximum distances from the user to create the finite 3D volume. In some examples, the distance D1 of the movement of the input object 206, alternate arm, or body may be multiplied by a scaling factor (e.g., 2×, 5×, etc.) to determine the distance D3 by which to set the maximum distance 228. The minimum distance 226 may be the location at which the movement of the distance D1 begins or ends.

In various examples, the finite 3D selection space 224 may include some objects, such as 218A, while excluding other objects, such as 218B, compared to the infinite 3D selection space of FIG. 2C. In such examples, where the finite 3D selection space 224 may include or at least partially include object 222A, but exclude object 218B, only object 222A may have an indicator 222A. Thus, by setting the maximum distance 228 and/or the minimum distance 226, the user 202 may include or exclude certain items from being selected by controlling the depth of the finite 3D selection space 224.

In some examples, once the finite 3D selection space 224 is created (and similarly for the infinite 3D selection space), the user 202 may interact with the object(s) 218 included in the selection space. For example, the user 202 may perform various actions on the object (e.g., moving, resizing, coloring, etc.), and/or may deselect one or more of the objects included in the selection space. In various examples, the 3D selection space (e.g., finite or infinite) may be visible to the user 202 by creating a virtual representation of the 3D selection space in the scene 200. In this way, the user 202 can visualize the 3D selection space as a virtual representation to determine the bounds and size of the 3D selection space.

Figure 3A:
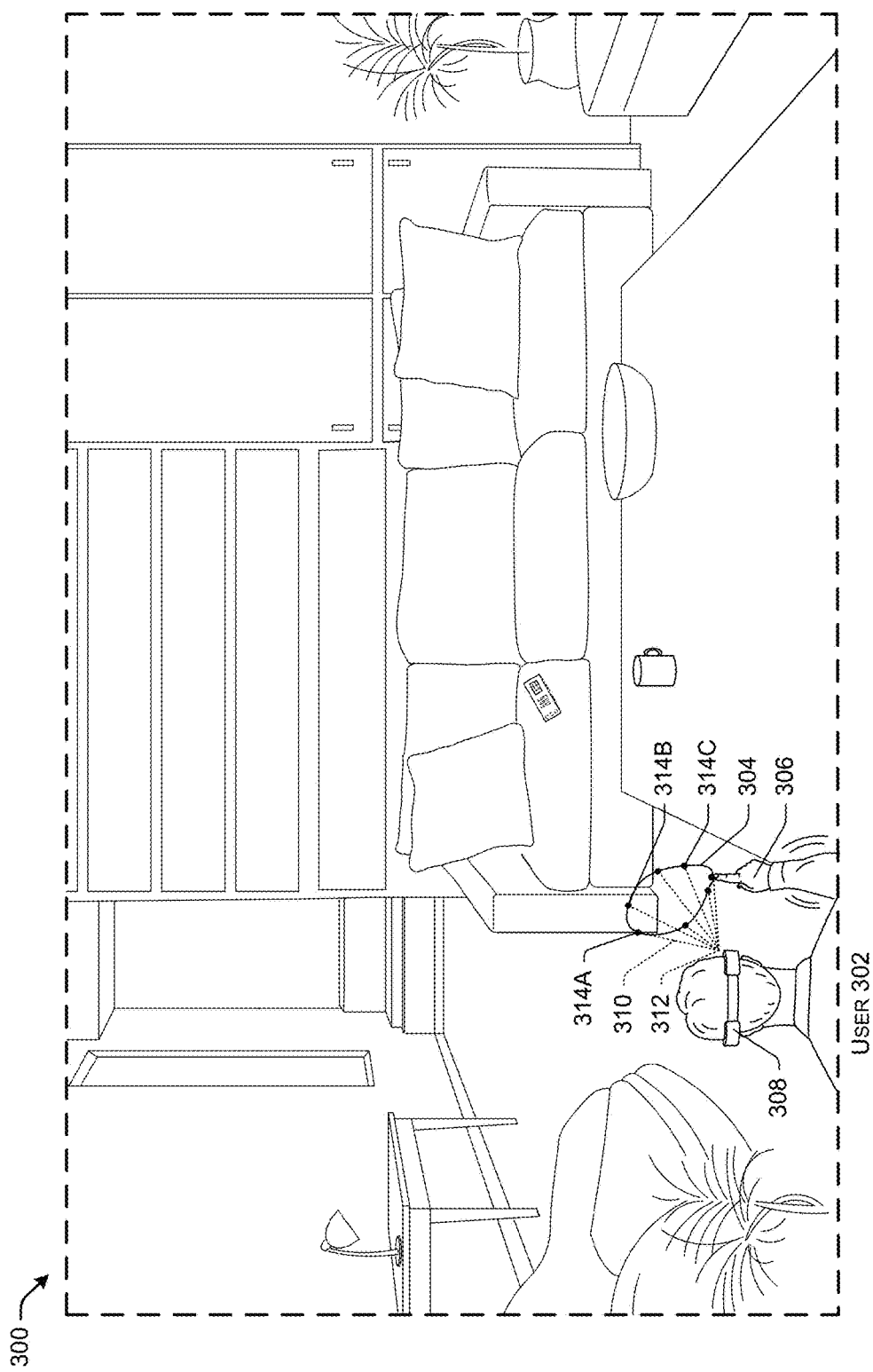

FIG. 3A and FIG. 3B illustrate an example process for selecting objects in a scene 300 using a movement data for an input object and gaze tracking data. As discussed above, the scene 300 may include a physical real world environment along with virtual objects presented by a display, or the scene may be entirely virtual reality objects presented by a display. As shown in FIG. 3A, a user 302 may make a movement 304 (i.e., gesture) using an input object 306 (i.e., hand, finger, six degrees of freedom control, etc.) in the scene 300. While the movement 304 is illustrated as a substantially circular shape (e.g., lasso tool formation), the movement 304 may be any type of movement usable to select objects in the scene 300.

In some examples, the user 302 may wear or otherwise be associated with a computing device 308, such as computing device 102. Although illustrated as a wearable computing device, computing device 308 may comprise any type of computing device usable to track movements and a gaze of the user 302. The computing device 308 may include sensors (i.e., sensor(s) 112) to obtain movement data corresponding to the movement 304 of the input object 306. Additionally, the computing device 308 may further include sensors (i.e., sensor(s) 112) to obtain gaze tracking data corresponding to a location of eyes of the user 302.

As shown in FIG. 3A, multiple gaze vectors 310 may be calculated. For example, the computing device 308 may include one or more modules (e.g., selection module 116) configured to calculate gaze vectors 310 originating at an origin point 312 and passing through multiple points 314 (e.g., 314A, 314B, 314C, etc.) along the shape defined by the movement 304. In some examples, the gaze vectors 310 may be calculated or determined using the gaze tracking data and/or the movement data. For instance, the selection module 116 may analyze the gaze tracking data to identify a location of eyes of the user 302 in the scene 300 relative to a point in space, such as a location of the input object 306, and analyze the movement data to determine the points 314 along the shape that the user 302 is facing or observing as the movement 304 of the input object 306 is performed. In various examples, the locations of the points 314 may be determined by analyzing the movement data and calculating 3D locations (e.g., x1, y1, z1) of the points in space. The 3D locations of the points 314 may be calculated with respect to the origin point 312, which may be defined as the origin (i.e., x0, y0, z0) of a grid defining the scene 300.

FIG. 3B illustrates techniques for projecting the shape defined by the movement 304 of the input object 306 in the scene 300. For example, the selection module 116 may project the shape by extending the gaze vectors 310 in a direction parallel to a vector which extends from a location near or at the eyes of the user to a point defined by the shape, such as a center point, for an infinite distance (i.e., extended out to infinity, extended a distance or location at which the sensors of the computing device can no longer measure, or extended until an object blocks the vectors from extending). In this way, the shape may be projected based on the vectors 310 to create a 3D volume, or 3D selection space 316. In various examples, the 3D selection space 316 may be bound to a finite volume using the techniques described above with respect to FIG. 2D.

As shown in FIG. 3B, the scene 300 may include multiple objects 318 that are included or at least partially included in the 3D selection space 316, and objects 320 that are not included, or less than a threshold portion is included, in the 3D selection space 316. The objects 318 included in the 3D selection space may be associated with indicators 322 to indicate that the objects 318 are selected. While the indicators 322 are represented as a dotted line around the objects 318, the indicators 322 may be highlighting the selected objects 318, a color change in the objects 318, an icon (e.g., arrow, number, etc.) placed nearby the selected objects 318, or any other visible indicator to show the objects 318 as being selected. In this way, the user 302 may be apprised of which objects in the scene are selected, or otherwise included in the 3D selection space.

In some examples, once the 3D selection space 316 is created (and similarly for an infinite 3D selection space), the user 302 may interact with the objects 318 included in the selection space. For example, the user 302 may perform various actions on the object (e.g., moving, resizing, coloring, etc.), and/or may deselect one or more of the objects included in the selection space. In various examples, the 3D selection space (e.g., finite or infinite) may be visible to the user 302 by creating a virtual representation of the 3D selection space in the scene 300. In this way, the user 302 can visualize the 3D selection space as a virtual representation to determine the bounds and size of the 3D selection space.

In various examples, the objects may be directly interacted with (e.g., moving, coloring/painting, etc.) without being selected first. For instance, responsive to the end of the movement of the input object 306, or responsive to detecting an ending action, the shapes included in the 3D selection space may automatically have an action performed on them without being selected first. In some examples, the user may have previously entered a mode, such as a paint mode, where the action is predetermined and taken on the objects included or at least partially included in the 3D selection space. In other examples, the type of action taken on the objects may be defined based on the starting action, or the type of shape defined by the movement of the object 306. For example, a particular starting action may be associated with a specific action to be taken on the objects, or a particular movement of the input object 306 may be associated with specific actions. For instance, a top left-to bottom right movement of the input object 306 may result in the objects included in the 3D volume or selection space being painted a particular color.

Example Computing Devices

Figure 4:
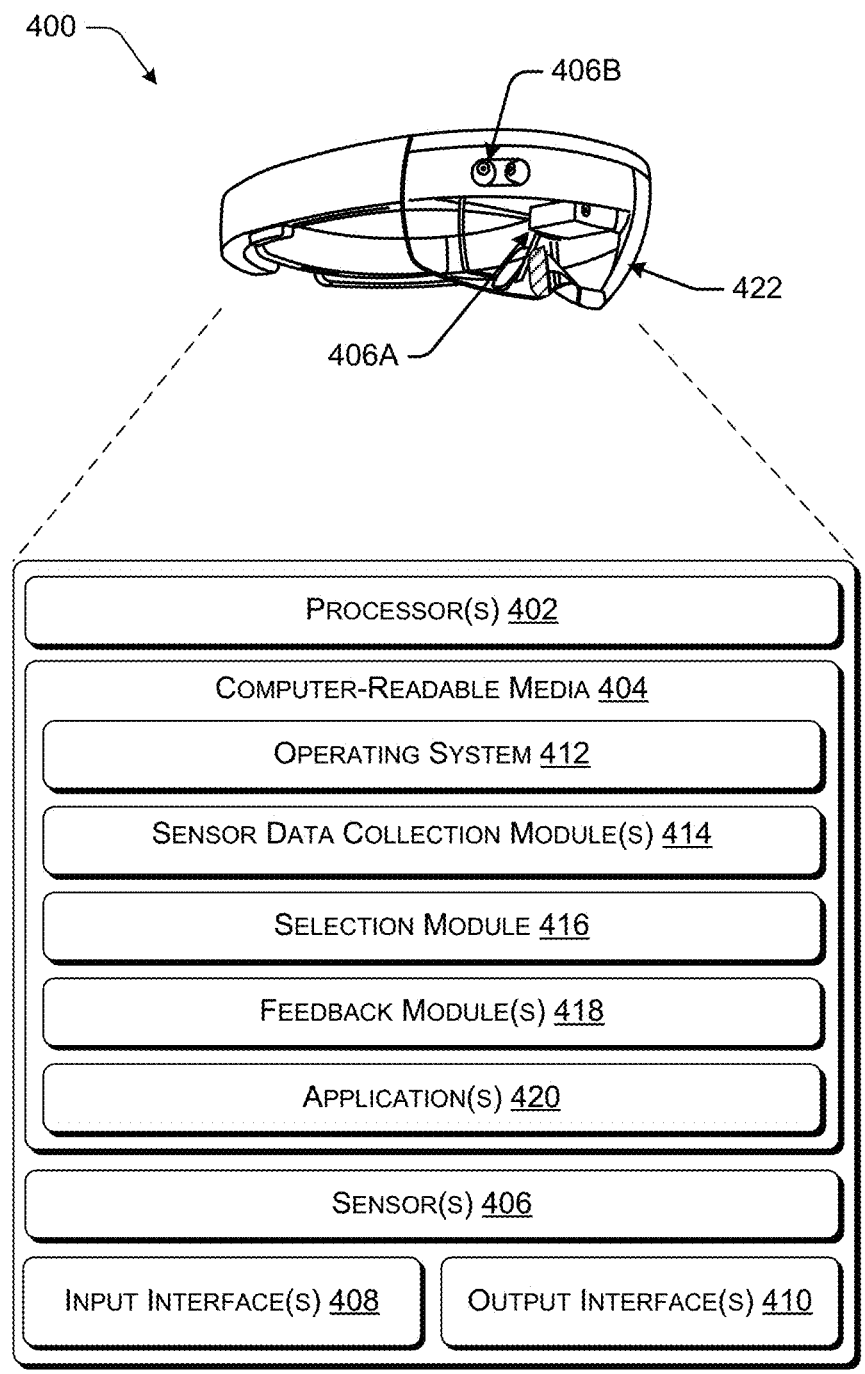
FIG. 4 illustrates details of an example head-mounted computing device that is usable to implement selection of multiple objects in a scene.

FIG. 4 illustrates details of an example computing device 400 that can be used to implement the selection techniques described herein. The computing device 400 may be representative of any of the computing devices 102 in FIG. 1. The computing device 400 in this example includes processor(s) 402, computer-readable media 404, sensor(s) 406, input interface(s) 408, and output interfaces(s) 410. In FIG. 4, device 400 is illustrated as a head-mounted device. However, device 400 can be any type of device configured capable of detecting gaze tracking of a user. This example is provided for illustrative purposes and is not to be construed as limiting. Additional details and example computing environments and computing devices are described below with reference to FIGS. 9-11.

Processor(s) 402 can represent, for example, a CPU-type processing unit, a GPU-type processing unit, a field-programmable gate array (FPGA), another class of digital signal processor (DSP), or other hardware logic components that can, in some instances, be driven by a CPU. For example, and without limitation, illustrative types of hardware logic components that can be used include Application-Specific Integrated Circuits (ASICs), Application-Specific Standard Products (ASSPs), System-On-a-Chip systems (SOCs), Complex Programmable Logic Devices (CPLDs), etc. In various examples, the processor(s) 402 can execute one or more instructions, modules, and/or processes to cause the device 402 to perform a variety of functions, such as those described as being performed by computing devices herein. Additionally, each of the processor(s) 402 can possess its own local memory, which also can store program modules, program data, and/or one or more operating systems. Additional details of example processors that can be used as processor(s) 402 are described below with reference to FIG. 9 and FIG. 11.

In at least one configuration, the computer-readable media 404 of the device 400 can store components that facilitate interaction between a user and the computing device 400. For example, the computer-readable media 404 can include an operating system 412, sensor data collection module(s) 414, a selection module 416, feedback module 418, and one or more applications 420. The operating system 412 can be configured to manage hardware and services within and coupled to the device 400 for the benefit of other components and/or modules. The sensor data collection module(s) 414 collect, store, and/or process sensor data collected from the sensor(s) 406 of the computing device. The selection module 416 includes program instructions to calculate a selection space for a user to select objects in a virtual or mixed reality scene. Specifically, the selection module 416 may be configured to establish create a 3D selection space based on gaze tracking data, movement data, and other inputs of the user and to select one or more objects located in the 3D selection space. The feedback module 418 may be configured to generate and cause output of feedback to a user via a display, speaker, haptic device, or other output of the computing device 400. By way of example and not limitation, the feedback module 418 may generate and output feedback informing the user when the user has successfully selected one or more objects in a scene. Application(s) 420 may correspond to any other applications stored in whole or in part on the computing device 400. By way of example and not limitation, the applications 420 may include gaming applications, file sharing applications, browser applications, search applications, productivity applications (e.g., word processing applications, spreadsheet applications, computer-aided design applications, etc.), communication applications (e.g., email, instant messaging, audio and/or video conferencing, social networking applications, etc.). The application(s) 420 can be stored in the computer-readable media 404 or otherwise accessible to the device 400 (e.g., via a network, such as network 104). Additional details of example applications that can be representative of application(s) 420 are described below with reference to FIGS. 9-11.

While FIG. 4 illustrates the selection module 416 and the feedback module 418 as being separate from the operating system 412 and the application(s) 420, in alternative examples, the selection module 416 and/or the feedback module 418 can be included in or integrated with the operating system 412 and/or one or more of the applications 420. In such examples, the operating system 412 and/or application(s) 420 having the integrated selection functionality can perform same or similar functionalities as described for the selection module 416 and/or the feedback module 418.

The modules can represent pieces of code executing on a computing device (e.g., computing device 102). In some examples, individual modules can include an interface, such as an Application Program Interface (API), to perform some or all of its functionality (e.g., operations). In additional and/or alternative examples, the components can be implemented as computer-readable instructions, data structures, and so forth that are executable by at least one processing unit (e.g., processor(s) 402) to configure the device 400 to perform operations including the selection techniques described herein. Functionality to perform these operations can be implemented by a single device or distributed across multiple devices. Additional details of an example distributed computing scenario are described with reference to FIG. 10. Additional details of example types of computer-readable media that can be used for computer-readable media 106 and 404 are provided below with reference to FIGS. 9-11.

In at least one example, the sensor(s) 406 can be any device or combination of devices configured to sense conditions of a user or surroundings of the user. The sensor(s) 406 include one or more user facing cameras 406A or other sensors for tracking locations of the eyes of the user in an environment, eye movement or gaze, facial expressions, pupil dilation and/or contraction, gestures, and/or other characteristics of the user. In some examples, the sensor(s) 406 also include one or more outwardly facing or environmental cameras 406B for capturing images of real-world objects and surroundings of the user. The sensor(s) 406 may additionally or alternatively include one or more biometric sensors (e.g., a galvanic skin response sensor for measuring galvanic skin response, a heart rate monitor, a skin temperature sensor for measuring the temperature on the surface of the skin, an electroencephalography (EEG) device for measuring electrical activity of the brain, an electrocardiography (ECG or EKG) device for measuring electrical activity of the heart), one or more other cameras (e.g., web cameras, infrared cameras, depth cameras, etc.), microphones or other sound sensors for measuring a volume of speech, a rate of speech, etc., light sensors, optical scanners, or the like. Individual sensor(s) 406 can output sensor data to corresponding sensor data collection module(s) 414 for suitable processing. For instance, a user facing camera 406A can capture gaze tracking data and an environment camera 406B can capture movement data, which may be processed by a corresponding sensor data collection module 414 to determine one or more gaze vectors and/or a gaze path or shape of the user. In another example, the user facing camera 406A and/or other sensors 406 (e.g., accelerometers, proximity sensors, magnetic field sensors, etc.) may identify a location of eyes of the user relative to another location in an environment. The sensor data collection module 414 may then output the gaze vectors and/or gaze path to the selection module 416 for use in establishing a 3D selection space for the user.

In additional and/or alternative examples, the sensor(s) 406 can be any device or combination of devices configured to detect a position or movement of the device 102 and other objects. For instance, the sensor(s) 406 can additionally and/or alternatively include a depth map sensor, a light field sensor, a gyroscope, a sonar sensor, an infrared sensor, a compass, an accelerometer, a global positioning system (GPS) sensor, and/or any other device or component for detecting a position or movement of the device 400 and/or other objects. The sensor(s) 406 can also enable the generation of data characterizing interactions, such as user gestures, with the device 400. For illustrative purposes, the sensor(s) 406 and/or an input interface 408 can enable the generation of data defining a position and aspects of movement, e.g., speed, direction, acceleration, of one or more objects, which can include device 400, physical items near the device 400, and/or users.

FIG. 4 shows an example in which at least some of the sensor(s) 406 are part of, or built into, the device 400. More specifically, FIG. 4 shows a non-limiting example where the device 400 includes the user facing camera sensor 406A and the environmental camera 406B disposed in or integrated with a nose-bridge component of the head-mounted display 400. As described above, each device 400 can include any configuration of one or more sensors 406 that can be part of, or built into, the device 400. However, in some examples, one or more sensors 406 can be removably coupled to the device 400, or be separate from and communicatively coupled to the device 400. In the latter case, sensor data can be communicated from the one or more sensors 406 to the device 400, for example, via a wired and/or wireless network.

As described above, the device 400 can include the input interface(s) 408 and output interface(s) 410. By way of example and not limitation, the input interface(s) 408 can include a keyboard, keypad, mouse, microphone, touch sensor, touch screen, joystick, control buttons, scrolling buttons, cameras, neural interface, or any other device suitable to generate a signal and/or data defining a user interaction with the device 400. By way of example and not limitation, the output interface(s) 410 can include a display (e.g., holographic display, head-up display, protector, touch screen, liquid crystal display (LCD), etc.), speakers, haptic interfaces, or the like. In some examples, the display may present virtual objects in a scene, such as scenes 200 and 300. The display may present the virtual objects in the scene where the scene includes a physical, real-world environment that includes the virtual objects when observing the display or looking through the display.

In at least one example, an output interface 410 can be a hardware display surface 422 that can be configured to allow for a real-world view of an object through the hardware display surface 422 while also providing a rendered display of computer generated content or scenes. The hardware display surface 422 can include one or more components, such as a projector, screen, or other suitable components for producing a display of an object and/or data. In some configurations, the hardware display surface 422 can be configured to cover at least one eye of a user. In one illustrative example, the hardware display surface 422 can include a screen configured to cover both eyes of a user. The hardware display surface 422 can render or cause the display of one or more images for generating a view or a stereoscopic image of one or more computer generated virtual objects. For illustrative purposes, an object can be an item, data, device, person, place, or any type of entity. In at least one example, an object can be associated with a function or a feature associated with an application. As will be described in more detail below, some configurations enable a device 400 to graphically associate holographic user interfaces and other graphical elements with an object seen through the hardware display surface 422 or rendered objects displayed on the hardware display surface 422.

The hardware display surface 422 can be configured to allow a user to view objects from different environments. In some configurations, the hardware display surface 422 can display a rendering of a computer generated virtual object. In addition, some configurations of the hardware display surface 422 can allow a user to see through selectable sections of the hardware display surface 422 having a controllable level of transparency, enabling the user to view objects in his or her surrounding environment. For illustrative purposes, a user's perspective looking at objects through the hardware display surface 422 is referred to herein as a "real-world view" of an object or a "real-world view of a physical object." As will be described in more detail below, computer generated renderings of objects and/or data can be displayed in, around, or near the selected portions of the hardware display surface 422 enabling a user to view the computer generated renderings along with real-world views of objects observed through the selected portions of the hardware display surface 422.

Some configurations described herein provide both a "see through display" and an "augmented reality display." For illustrative purposes, the "see through display" can include a transparent lens that can have content displayed on it. The "augmented reality display" can include an opaque display that is configured to display content over a rendering of an image, which can be from any source, such as a video feed from a camera used to capture images of an environment. For illustrative purposes, some examples described herein describe a display of rendered content over a display of an image. In addition, some examples described herein describe techniques that display rendered content over a "see through display" enabling a user to see a real-world view of an object with the content. It can be appreciated that the examples of the techniques described herein can apply to a "see through display," an "augmented reality display," or variations and combinations thereof. For illustrative purposes, devices configured to enable a "see through display," "augmented reality display," or combinations thereof are referred to herein as devices that are capable of providing a "mixed environment" or "mixed reality scene."

Additional details associated with the hardware display surface 422 are described below with reference to FIGS. 5A-5C, 6A-6F, 7A-7F. Additional details associated with the input interface(s) 408 and/or the output interface(s) 410 are described below with reference to FIG. 9 and FIG. 11.

Example Gaze Tracking

Referring now to FIGS. 5A-5C, 6A-6F, 7A-7F, and 8 the following section describes techniques for identifying a gaze target, such as described in the preceding examples (e.g., points 314A, 314B, 314C, etc.). The techniques are described in the context of a head-mounted computing device having a user facing gaze tracking camera. However, the techniques described in this section can also be applied to other types of computing devices having a user facing camera for gaze tracking (e.g., computer with a web camera 102B, a tablet or smartphone with user-facing camera 102C, a game console with user facing camera 102D, etc.). As described above, the techniques described herein may include analyzing gaze tracking data to calculate or determine vectors which originate at or near eyes of the user and pass through points on a shape defined by a movement of an object. The techniques may be performed independent of the actual gaze of the user, and the gaze tracking data may identify the location of eyes of the user relative to an input object and regardless of the gaze of the user. However, in some examples, the gaze tracking data may identify a gaze of the user and calculate the vectors based on where the user is gazing. These and other techniques are described below at least with respect to FIGS. 5A-5C, 6A-6F, 7A-7F, and 8.

Figure 5A:
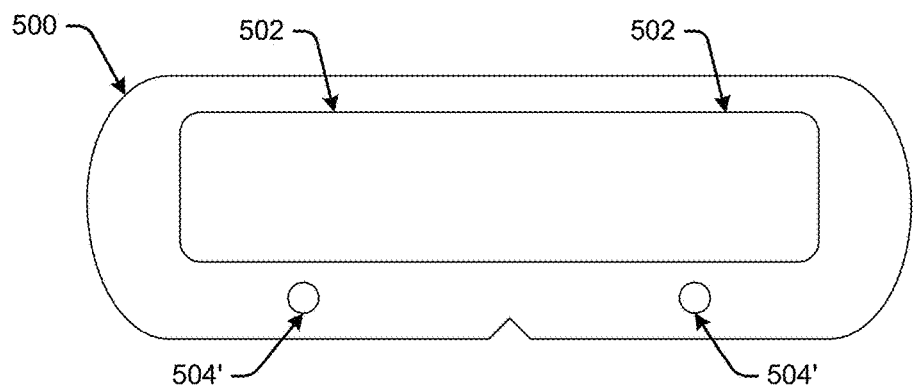
FIG. 5A-FIG. 5C illustrate example details of identifying gaze targets by tracking a gaze of a user.

FIG. 5A is back view of a device 500 (e.g., device 102, device 400, etc.) having a hardware display surface 502 (e.g., hardware display surface 422) and one or more sensors 504 and 504' (such as cameras 406B and 406A, respectively, of computing device 400). To facilitate functionality described herein, in at least one example, sensor(s) 504' are user facing (such as user facing camera 406A) and can be configured to track the position of at least one eye of a user. In addition, at least one other sensor 504 is environment facing (such as environmental camera 406B) and can be directed toward a real-world object for generating image data of the real-world object. As will be described in more detail below, examples can process eye position data, image data, and other data to identify a gaze target that is a rendered object displayed on a hardware display surface 502 or a real-world object viewed through a transparent section of the hardware display surface 502. As will also be described below, examples described herein can also determine if the user is looking at a particular section of a hardware display surface 502, a particular part of a real-world object, or a particular part of a rendered object. Such information can be useful for determining gaze targets (e.g., points 314A 314B, and 314C) from gaze tracking data to establish the shape 304.

In FIG. 5A, the device 500 comprises two of the user facing sensors 504' for generating data or a signal indicating the position or movement of at least one eye of a user. The sensors 504' can be in the form of a camera or another suitable device for tracking the position or movement of at least one eye of the user. The device 500 also comprises at least one hardware display surface 502 (such as hardware display 422 of computing device 400, or a display screen associated with one of computing devices 108B, 108C, or 108D, for example) for allowing a user to view one or more objects. The hardware display surface 502 can provide a view of a real-world object through the hardware display surface 502 as well as images of rendered objects that can be displayed on the hardware display surface 502, as described above.

Figure 5B:
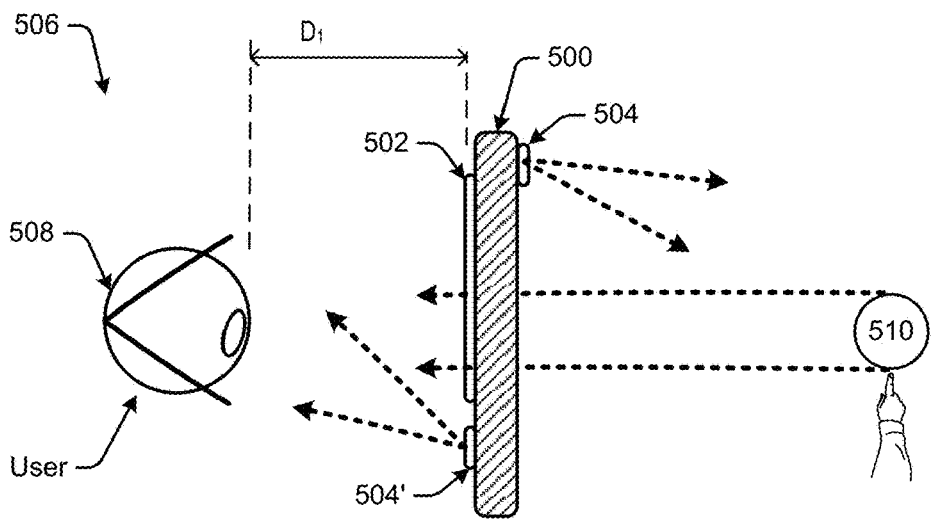

FIG. 5B is a side cutaway view 506 of the device 500 shown in FIG. 5A. FIG. 5B includes an eye 508 of a user looking through the hardware display surface 502. The hardware display surface 502 is configured to create transparent sections enabling a user to view objects through the hardware display surface 502. FIG. 5B shows an example arrangement where a real-world object 510 is aligned with a transparent section of the hardware display surface 502 allowing the user to view the real-world object 510 through the hardware display surface 502. The hardware display surface 502 can display one or more rendered objects. The device 500 also comprises at least one sensor 504' directed toward at least one eye 508 of the user.

Figure 5C:
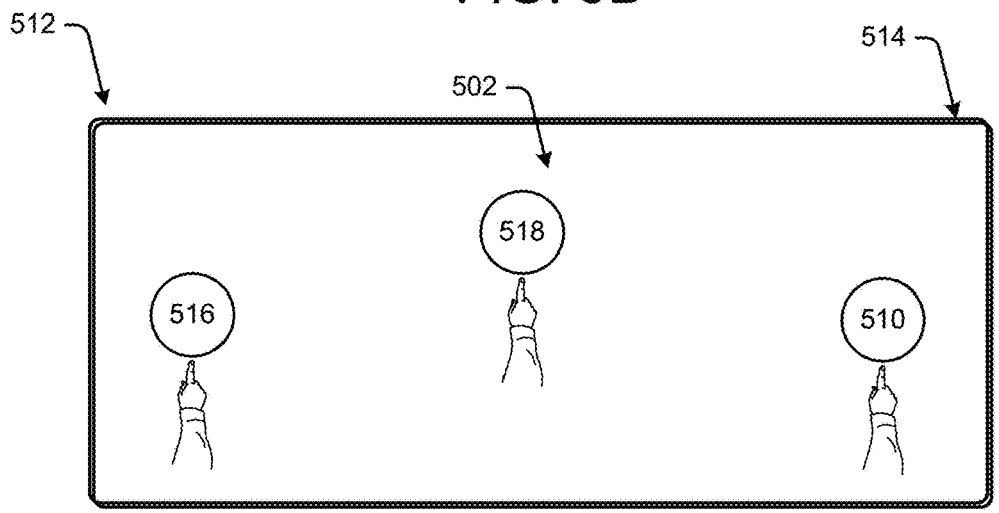

FIG. 5C illustrates an example scene or view 512 that can be observed by a user via the hardware display surface 502. The thick double line 514 illustrates the boundary of the hardware display surface 502. In this illustrative example, the scene or view 512 includes a first rendered object 516, a second rendered object 518, and a third rendered object 520 that are displayed on the hardware display surface 502. The real-world object 510 is viewed through the hardware display surface 502.

In a non-limiting example described above, a user can be attempting to create a shape (e.g., shape 304). For instance, in order to select objects in the scene 512, the user may define a shape. The shape in this example includes points 314A, 314B, and 314C corresponding to the first rendered object 516, the second rendered object 518, and the real-world object 510. In practice, other filler objects (i.e., rendered objects and/or real-world objects that do not correspond to points 314 along the shape 304) may also be included in the scene or view 512. The selection module (e.g., 116 or 416) can receive sensor data from one or more sensors of a computing device (e.g., sensor(s) 112, 406, or 504) as the user moves an object in the environment to define the shape 304. The selection module and/or the feedback module (e.g., 418) can cause feedback (e.g., audio, visual, haptic, etc.) to be presented inform the user that the shape 304 has been defined.

To facilitate aspects of such an example, the device 500 can utilize one or more techniques for calibrating the device 500. The following section, in conjunction with FIGS. 6A-6F, describes aspects of a technique for obtaining calibration data. A subsequent section, in conjunction with FIG. 7A-FIG. 7F, describes aspects of an example scenario where a device 500 processes the calibration data and other data to identify a gaze target.

A device 500 can be calibrated in a number of ways. In one example, a device 500 can utilize the display of a number of graphical elements at predetermined locations. As the graphical elements are displayed, the device 500 can prompt the user to look at a particular graphical element and provide an input to verify that the user is looking at the particular graphical element. When the user verifies that he or she is looking at the particular graphical element, sensor(s) 504' can generate eye position data defining a position of at least one eye. The eye position data can be stored in a data structure in memory in response to receiving the verification from the user.

Figure 6A:
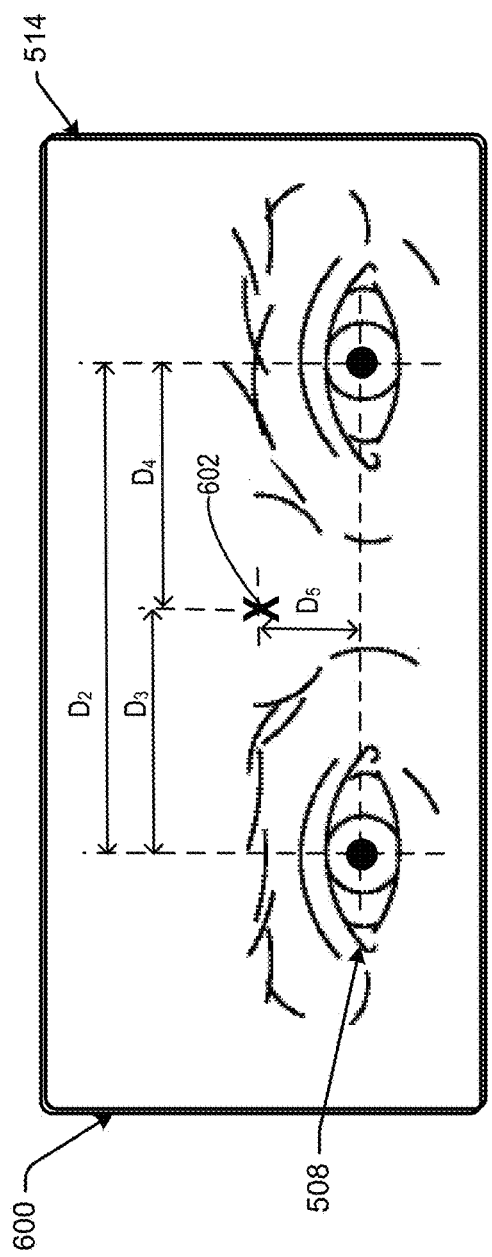

FIG. 6A illustrates an example view 600 that can be captured by the sensors 504' of the device 500. From such a perspective, the device 500 can determine one or more values that define the position of at least one eye 508 of the user. In one illustrative example, the values can include a second value (D2) indicating a distance between a user's eyes and a third value (D3), fourth value (D4), and a fifth value (D5) indicating a distance between at least one eye of the user and a reference point 602. It can be appreciated that by the use of one or more image processing technologies, one or more aspects of an eye, such as the pupil, can be identified and utilized to determine an eye position.

In addition, by the use of one or more suitable technologies, a reference point 602 can be selected. A reference point 602 can be based on a feature of the user, e.g., a tip of a nose, an eyebrow, a beauty mark, or a reference point 602 can be in an arbitrary location. In the example of FIG. 6A, a point between the user's eyes is used as a reference point 602. This example reference point 602 is provided for illustrative purposes and is not to be construed as limiting. It can be appreciated that the reference point 602 is can be in any suitable location, which can be based on an identifiable feature or characteristic of a user or any object.

Figure 6B:
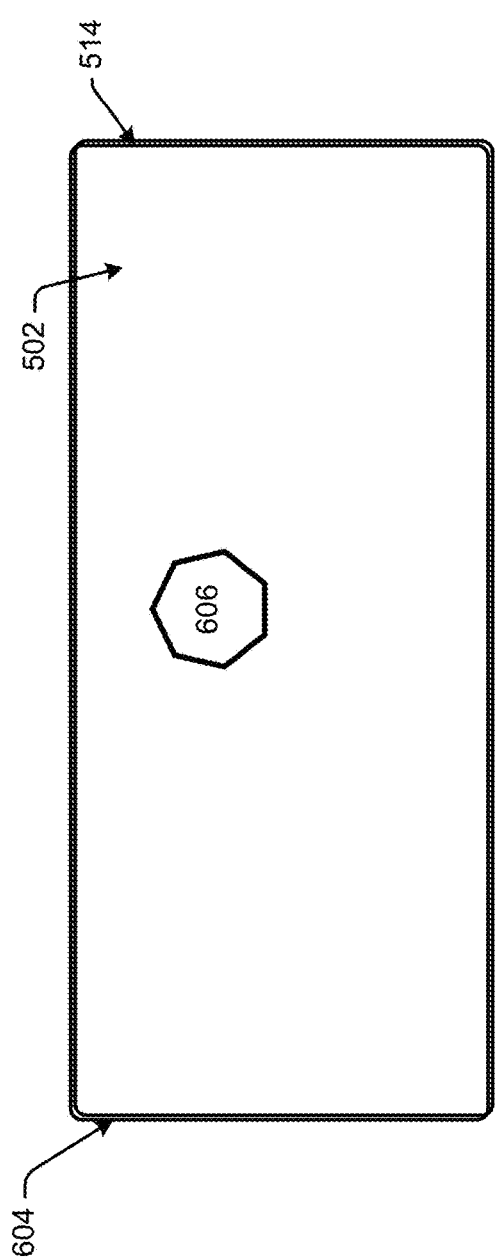

As described above, the device 500 can generate a number of graphical elements at predetermined locations of the hardware display surface 502. As the graphical elements are displayed on the hardware display surface 502, the device 500 can prompt the user to look at the graphical elements and provide an input to verify that the user is looking at the graphical elements. FIG. 6B illustrates an example view 604 of a graphical element 606 that can be generated by the device 500 to facilitate the calibration process. In this example, the device 500 generates a rendering of a graphical element 606 in the center of the viewing area. While the graphical element 606 is displayed, the device 500 can generate a prompt for the user to verify that he or she is looking at the graphical element 606. The prompt, as well as a user response to the prompt, can include a gesture, voice command, or other suitable types of input.

When the device 500 verifies that the user is looking at the graphical element 606, the device 500 can record one or more values indicating the position and/or the movement of at least one eye 508 of the user. For instance, one or more values described above and shown in FIG. 5B and FIG. 6A can be stored in a data structure in memory. It can be appreciated that any suitable value or a combination of values can be stored and utilized, including but not limited to, the first value (D1) indicating the distance between the sensors 504' and at least one eye 508 of a user, the second value (D2) indicating the distance between the eyes of a user, and other values (D3, D4, and D5) indicating the distance between at least one eye 508 and a reference point 602. These values are provided for illustrative purposes and are not to be construed as limiting. It can be appreciated that such values, subsets of such values, and other values of other measurements can be utilized in determining the movement and/or the position of one or more eyes of a user.

Figure 6C:
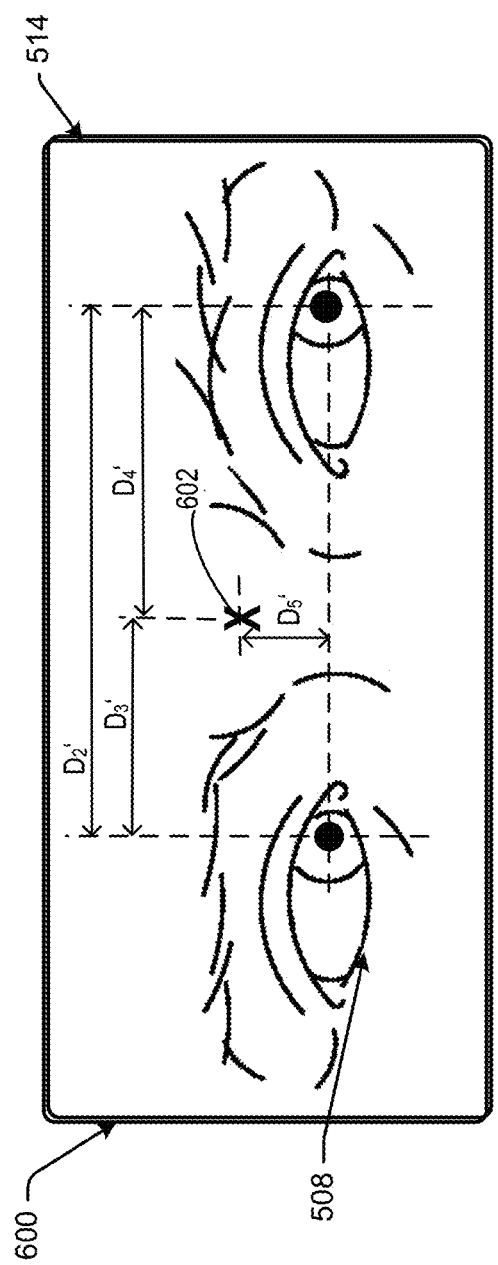
Figure 6D:
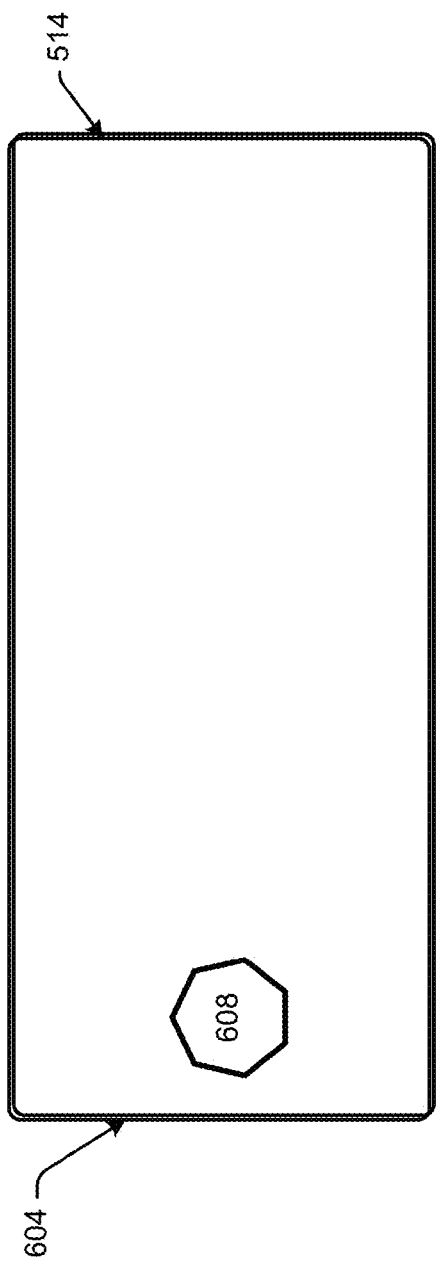

Other sets of values can be measured during the display of other graphical elements displayed in various positions. For example, as shown in FIG. 6C, a second set of values (D2', D3', D4', and D5') can be measured when a second graphical element 1408 is displayed, as shown in FIG. 6D. As shown in FIG. 6E, a third set of values (D2", D3", D4", and D5") can be measured when a third graphical element 610 is displayed, as shown in FIG. 6F.

These example measurements and the locations of the graphical elements are provided for illustrative purposes. It can be appreciated that any number of graphical elements can be placed at different locations to obtain measurements that can be used to calibrate a device 500. For example, the device 500 can sequentially display a graphical element at pre-determined locations of the view 604, such as each corner of the view 604. As can be appreciated, more or fewer graphical elements can be used in the calibration process.

The values that indicate the position of at least one eye 508 at each pre-determined location can be used to generate calibration data. The calibration data can be configured to correlate the sets of eye position data with data identifying the positions of the graphical elements.

Any known technique suitable for generating calibration data can be used. It can be appreciated that the generation of calibration data can include extrapolation, projection and/or estimation technologies that can project correlations between sets of eye position data and various sections of a hardware display surface 502 and/or pixels of a hardware display surface 502. These examples are provided for illustrative purposes and are not to be construed as limiting, and the values and/or calibration data can be obtained in other ways, including receiving such calibration data from one or more remote resources.

Once the calibration data is generated or obtained, such data and other data can be utilized by the device 500 to determine if a user is looking at a particular gaze target, which can include a part of a hardware display surface 502, a rendered object, part of a rendered object, a real-world object, or part of a real-world object. FIGS. 7A-7F describe aspects of an example scenario where the device 500 having at least one sensor 504' is used to track the movement of at least one eye 508 of a user to identify a gaze target.

Referring now to FIG. 7A and FIG. 7B, an example scenario showing the identification of a gaze target is shown and described. In this example, the user is looking at the example view 512. As summarized above with reference to FIG. 5C, the example view 512 comprises both a view of rendered objects (e.g., first rendered object 516, second rendered object 518, and third rendered object 510) on the hardware display surface 502. While the user is looking at the view 512, the sensor(s) 504' can cause the generation of one or more measured values, such as the values shown in the FIG. 7A. In some examples, using any combination of suitable technologies, such values can be compared against the calibration data and/or other data to identify a gaze target. In this example, one or more values measured in the scenario depicted in FIG. 7A can be processed with the calibration data to determine that the user is looking at the first rendered object 516. In such an example, the one or more measured values shown in FIG. 7A can also be used to determine that the user is looking at a predetermined section of an interface, such as the first section 700 of the hardware display surface 502 in FIG. 7B.

In continuing the present example, one or more values measured in the scenario depicted in FIG. 7C can be processed with the calibration data to determine that the user is looking at the second rendered object 518. In such an example, the one or more measured values shown in FIG. 7C can also be used to determine that the user is looking at a second section 702 of the hardware display surface 502 in FIG. 7D.

In continuing the present example, one or more values measured in the scenario depicted in FIG. 7E can be processed with the calibration data to determine that the user is looking at the real-world object 510. In such an example, the one or more measured values shown in FIG. 15E can be processed with the calibration data to determine that the user is looking at a third section 704 of the hardware display surface 502 in FIG. 7F.

In some examples, the device 500 can utilize data from a combination of resources to determine if a user is looking at the real-world object 510 through the hardware display surface 502. As summarized above, a camera or other type of sensor 504 (FIG. 5A) mounted to the device 500 can be directed towards a user's field of view. Image data generated from the camera can be analyzed to determine if an object in the field of view is in a pre-determined position of an image of the image data. If an object is positioned within a pre-determined area of an image, such as the center of the image, a device can determine a gaze target processing such data with eye position data. Such data can be utilized to supplement other types of data, such as position data from a GPS and/or data generated from a compass or accelerometer, to assist device 500 to determine a gaze direction, e.g., left, right, up, or down, and/or a gaze target.

Figure 8:
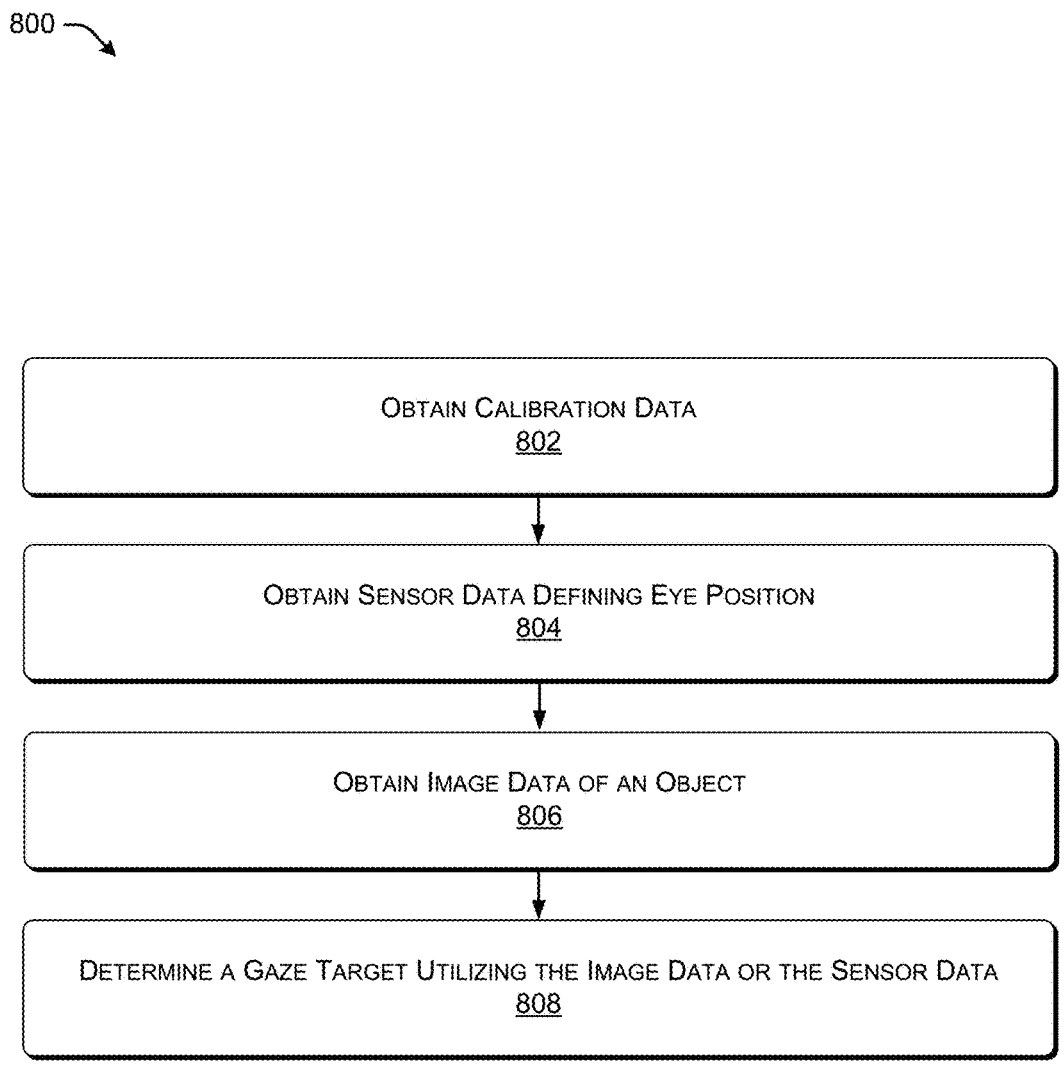
FIG. 8 is a flowchart illustrating aspects of an example process for determining a gaze target from gaze tracking data.

FIG. 8 is a flowchart illustrating aspects of an example process 800 for determining a gaze target. In FIG. 8, the operations are described in the context of device 400 for convenience. However, the operations are applicable to other devices as well including, but not limited to, computing devices 102 and 500.

Block 802 illustrates obtaining calibration data. In at least one example, the operating system 412, an application 420, or another module associated with the computer-readable media 404, can obtain calibration data. The calibration data can be stored in a data structure in the computer-readable media 404 or any computer readable storage medium for access at a later time. The calibration data can be generated by the device 400 or the calibration data can be received from a remote resource. In some examples, sensors 406A of computing device 400 can be positioned to track the position of at least one eye of a user. The sensors 406A can cause the generation of one or more values that correlate the position of at least one eye of a user with a particular section or position of a hardware display surface 422. Such examples can utilize an initialization process where the device 400 displays one or more graphical elements at pre-determined locations. During the display of the one or more graphical elements, one or more inputs from a user can indicate that they are looking at the one or more graphical elements. In response to the input, a device can generate calibration data comprising the values that correlate the position of at least one eye of a user with data identifying a particular position or section of a hardware display surface 422.

Block 804 illustrates obtaining sensor data indicating the position of at least one eye of the user. In at least one example, the operating system 412, an application 420, or another module associated with the computer-readable media 404, can obtain sensor data from the sensor(s) 406A. The sensor data can be stored in a data structure in the sensor data collection module(s) 414 or elsewhere in the computer-readable media 404 or any computer readable storage medium for access at a later time. As summarized above, sensor(s) 406A directed toward at least one eye of the user can cause the generation of sensor data (e.g., gaze tracking data) indicating the position of at least one eye of the user. The sensor data can be processed to generate data indicating a gaze direction of a user. As will be described below, the data indicating the gaze direction of the user can be processed with the calibration data to determine if the user is looking at a gaze target, which can include a rendered object displayed on the hardware display surface 422.

Block 806 illustrates obtaining image data of an object. In at least one example, the operating system 412, an application 420, or another module associated with the computer-readable media 404, can obtain sensor data. The image data or other information about the object can be stored in a data structure in the sensor data collection module(s) 414, the gaze-based password module 416, or elsewhere in the computer-readable media 404 or any computer readable storage medium for access at a later time. In some examples, a camera or other type of sensor 406B mounted to or otherwise in communication with the computing device 400 can be directed towards a user's field of view. The camera or other type of sensor 406B can cause the generation of image data, which can include one or more images of an object that is in the user's field of view. The image data can be in any suitable format and generated by any suitable sensor 406B, which can include the use of a depth map sensor, camera, etc.

Block 808 illustrates determining a gaze target utilizing the image data or the sensor data. In at least one example, the operating system 412, an application 420, the gaze-based password module 416, or another module associated with the computer-readable media 404, can determine the gaze target. For instance, if the user is looking at a real-world view of the object through the hardware display surface 422, and the sensor 406B directed towards the user's field of view generates image data of the object, the image data can be analyzed to determine if the object in the field of view is in a pre-determined position of an image of the image data. For example, if an object is positioned within a pre-determined area of an image, such as the center of the image, the computing device 400 can determine that the object is a gaze target. In another example, sensor data (e.g., gaze tracking data) indicating the position of at least one eye of the user can be processed with the calibration data and/or image data to determine if the user is looking at a rendered object displayed on the hardware display surface 422. Such an example can be used to determine that the rendered object displayed on the hardware display surface 422 is a gaze target.

Additional Example Computing Architectures

Figure 9:
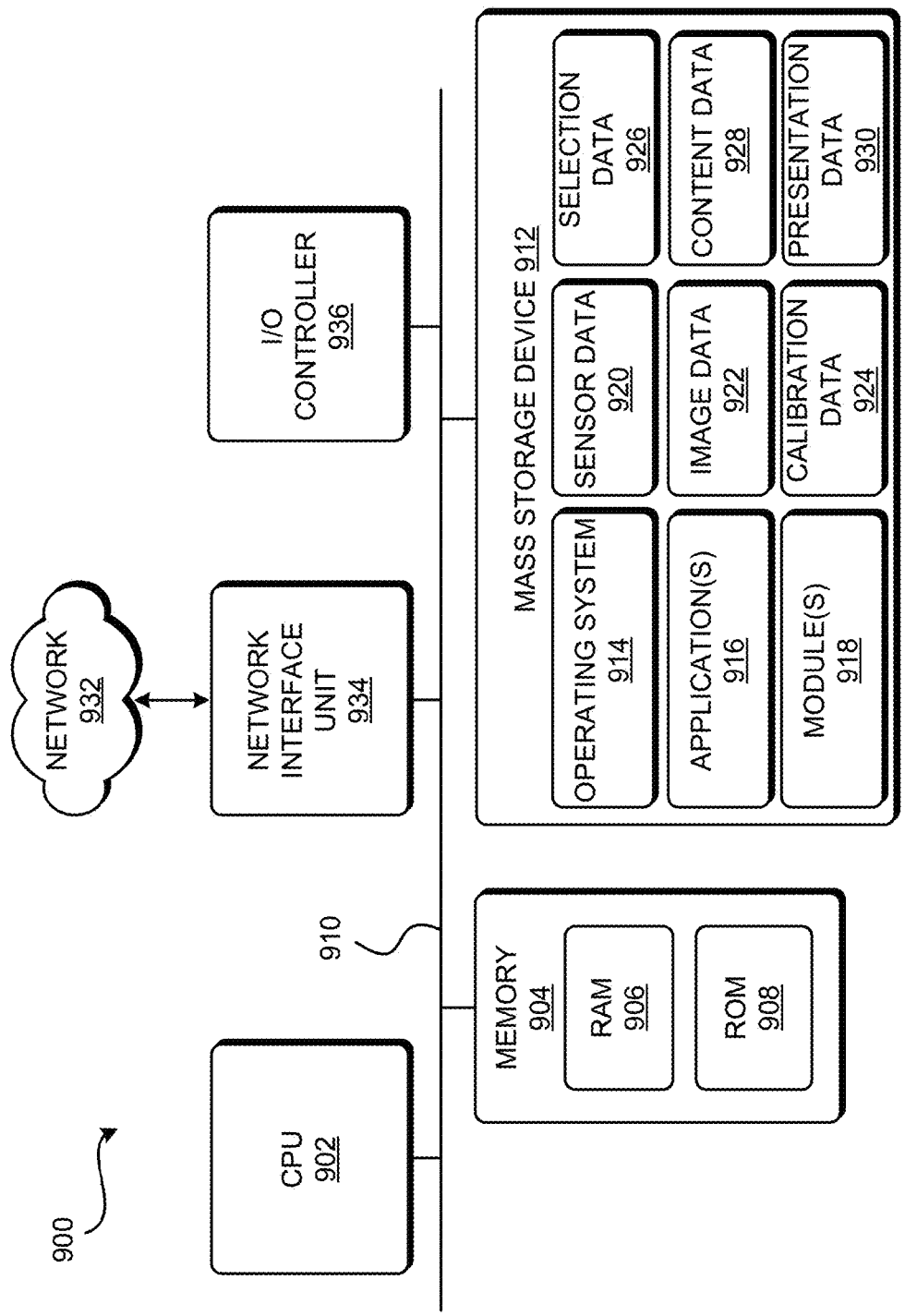
FIG. 9 is a schematic diagram illustrating an example computer architecture usable to implement aspects of selecting of objects.

FIG. 9 shows additional details of an example computer architecture 900 for a computer, such as computing device 108, computing device 400, device 500, and/or server(s) 110, capable of executing the program components described above for selecting objects in a scene. Thus, the computer architecture 900 illustrated in FIG. 9 illustrates an architecture for a server computer, mobile phone, a PDA, a smart phone, a desktop computer, a netbook computer, a tablet computer, a laptop computer, and/or a wearable computer. The computer architecture 900 is an example architecture that can be used to execute, in whole or in part, aspects of the software components presented herein.

The computer architecture 900 illustrated in FIG. 9 includes a central processing unit 902 ("CPU"), a system memory 904, including a random access memory 906 ("RAM") and a read-only memory ("ROM") 908, and a system bus 910 that couples the memory 1704 to the CPU 1702. A basic input/output system ("BIOS") containing the basic routines that help to transfer information between elements within the computer architecture 900, such as during startup, is stored in the ROM 908. The computer architecture 900 further includes a mass storage device 912 for storing an operating system 914 (e.g., operating system 412), application(s) 916 (e.g., application(s) 114, application(s) 420, etc.) programs, module(s) 918 (e.g., selection modules 116 and 416, sensor data collection module(s) 414, feedback module(s) 418, etc.), and the like, as described above with reference to FIG. 1 and FIG. 4. Additionally and/or alternatively, the mass storage device 912 can store sensor data 920 (e.g., from sensors 112, 406, 504, etc.), image data 922 (e.g., photographs, computer generated images, object information about real and/or virtual objects in a scene, metadata about any of the foregoing, etc.), calibration data 924, selection data 926 (e.g., gaze targets, gaze paths, gaze vectors, coordinates, or other information defining selection shapes or spaces), content data 928 (e.g., computer generated images, videos, scenes, etc.), presentation data 930 (e.g., instructions, prompts, etc.), and the like, as described herein.

The mass storage device 912 is connected to the CPU 902 through a mass storage controller (not shown) connected to the bus 910. The mass storage device 912 and its associated computer-readable media provide non-volatile storage for the computer architecture 900. Mass storage device 912, computer-readable media 110 and computer-readable media 404 are examples of computer-readable media according to this disclosure. Although the description of computer-readable media contained herein refers to a mass storage device, such as a solid state drive, a hard disk or CD-ROM drive, it should be appreciated by those skilled in the art that computer-readable media can be any available computer storage media or communication media that can be accessed by the computer architecture 900.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of communication media.

By way of example, and not limitation, computer storage media can include volatile and non-volatile, removable and non-removable media implemented in any method or technology for storage of information such as computer-readable instructions, data structures, program modules or other data. For example, computer storage media includes, but is not limited to, RAM, ROM, erasable programmable read-only memory ("EPROM"), electrically erasable programmable read-only memory ("EEPROM"), flash memory or other solid state memory technology, compact disc read-only memory ("CD-ROM"), digital versatile disks ("DVD"), high definition/density digital versatile/video disc ("HD-DVD"), BLU-RAY disc, or other optical storage, magnetic cassettes, magnetic tape, magnetic disk storage or other magnetic storage devices, or any other medium which can be used to store the desired information and which can be accessed by the computer architecture 900. For purposes of the claims, the phrase "computer storage medium," "computer-readable storage medium," and variations thereof, does not include communication media.

According to various configurations, the computer architecture 900 can operate in a networked environment using logical connections to remote computers through the network 932 and/or another network (not shown). The computer architecture 900 can connect to the network 932 through a network interface unit 934 connected to the bus 910. It should be appreciated that the network interface unit 934 also can be utilized to connect to other types of networks and remote computer systems. The computer architecture 900 also can include an input/output controller 936 for receiving and processing input from input device(s) or input interface(s), and to provide output to an output device or output interface. Numerous examples of input and output devices and interfaces are provided throughout the application. For instance, the input/output controller 936 can receive and process data from the input interface(s) 408 and/or provide output to output interface(s) 410 described above with reference to FIG. 4.

It should be appreciated that the software components described herein can, when loaded into the CPU 902 and executed, transform the CPU 902 and the overall computer architecture 900 from a general-purpose computing system into a special-purpose computing system customized to facilitate the functionality presented herein. The CPU 902 can be constructed from any number of transistors or other discrete circuit elements, which can individually or collectively assume any number of states. More specifically, the CPU 902 can operate as a finite-state machine, in response to executable instructions contained within the software modules described herein. These computer-executable instructions can transform the CPU 902 by specifying how the CPU 902 transitions between states, thereby transforming the transistors or other discrete hardware elements constituting the CPU 902. In some examples, processor(s) 108 and/or processor(s) 402 can correspond to CPU 902.

Encoding the software modules presented herein also can transform the physical structure of the computer-readable media presented herein. The specific transformation of physical structure can depend on various factors, in different implementations of this description. Examples of such factors can include, but are not limited to, the technology used to implement the computer-readable media, whether the computer-readable media is characterized as primary or secondary storage, and the like. For example, if the computer-readable media is implemented as semiconductor-based memory, the software described herein can be encoded on the computer-readable media by transforming the physical state of the semiconductor memory. For example, the software can transform the state of transistors, capacitors, or other discrete circuit elements constituting the semiconductor memory. The software also can transform the physical state of such components in order to store data thereupon.

As another example, the computer-readable media described herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations also can include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 900 in order to store and execute the software components presented herein. It also should be appreciated that the computer architecture 900 can include other types of computing entities, including hand-held computers, embedded computer systems, personal digital assistants, and other types of computing entities known to those skilled in the art. It is also contemplated that the computer architecture 900 may not include all of the components shown in FIG. 9, can include other components that are not explicitly shown in FIG. 9, or can utilize an architecture completely different than that shown in FIG. 9.

Figure 10:
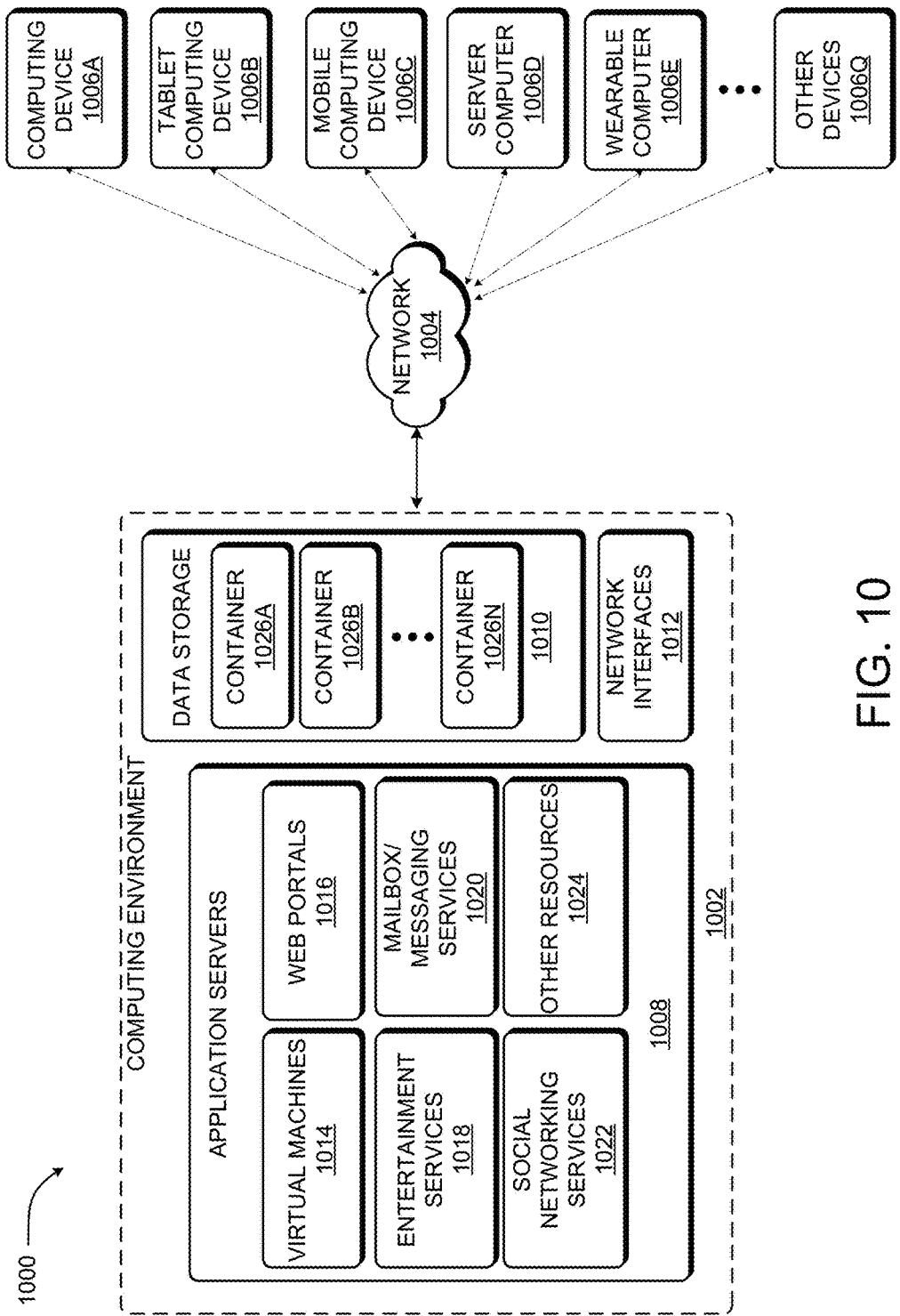
FIG. 10 is a schematic diagram illustrating an example distributed computing environment capable of implementing aspects of selecting objects.

FIG. 10 depicts an example distributed computing environment 1000 capable of executing the software components described herein for implementing selection techniques. Thus, the distributed computing environment 1000 illustrated in FIG. 10 can be utilized to execute any aspects of the software components presented herein to achieve aspects of the techniques described herein.

According to various implementations, the distributed computing environment 1000 includes a computing environment 1002 operating on, in communication with, or as part of a network 1004. In at least one example, at least some of computing environment 1002 can correspond to the one or more of the computing devices 102, the computing device 400, and/or the computing device 500. The network 1004 can be or can include network 932, described above with reference to FIG. 9. The network 1004 also can include various access networks. One or more client devices 1006A-1006N (hereinafter referred to collectively and/or generically as "clients 1006") can communicate with the computing environment 1002 via the network 1004 and/or other connections (not illustrated in FIG. 10). By way of example, computing device 102 in FIG. 1, computing device 400 in FIG. 4, and device 500 in FIG. 5A can correspond to one or more of client devices 1006A-1006Q (collectively referred to as "clients 1006"), where Q may be any integer greater than or equal to 1 depending on the desired architecture. In one illustrated configuration, the clients 1006 include a computing device 1006A such as a laptop computer, a desktop computer, or other computing device, a slate or tablet computing device ("tablet computing device") 1006B, a mobile computing device 1006C such as a mobile telephone, a smart phone, or other mobile computing device, a server computer 1006D, a wearable computer 1006E, and/or other devices 1006N. It should be understood that any number of clients 1006 can communicate with the computing environment 1002. Two example computing architectures for the clients 1006 are illustrated and described herein with reference to FIG. 9 and FIG. 11. It should be understood that the illustrated clients 1006 and computing architectures illustrated and described herein are illustrative, and should not be construed as being limited in any way.

In the illustrated configuration, the computing environment 1002 includes application servers 1008, data storage 1010, and one or more network interfaces 1012. According to various implementations, the functionality of the application servers 1008 can be provided by one or more server computers that are executing as part of, or in communication with, the network 1004. In some examples, the computing environment 1002 can correspond to or be representative of one or more servers (i.e., distributed computing environment 102P), which are in communication with and accessible by the clients 1006. In that case, the applications servers 1008 are examples of servers included in distributed computing environment 102P. For example, the computing environment 1002 can correspond to devices in the distributed computing environment 102P which provide additional services and/or functionality for the device 102. It should be understood that this example is illustrative, and should not be construed as being limited in any way.

In at least one example, the application servers 1008 can host various services, virtual machines, portals, and/or other resources. In the illustrated configuration, the application servers 1008 can host one or more virtual machines 1014 for executing applications or other functionality. According to various implementations, the virtual machines 1014 can execute one or more applications and/or software modules for implementing selection techniques. The application servers 1008 also host or provide access to one or more portals, link pages, Web sites, and/or other information ("Web portals") 1016. The Web portals 1016 can be used to communicate with one or more client computers. The application servers 1008 can include one or more entertainment services 1018. The entertainment services 1018 can include various gaming experiences for one or more users 104.

According to various implementations, the application servers 1008 also include one or more mailbox and/or messaging services 1020. The mailbox and/or messaging services 1020 can include electronic mail ("email") services, various personal information management ("PIM") services (e.g., calendar services, contact management services, collaboration services, etc.), instant messaging services, chat services, forum services, and/or other communication services.

The application servers 1008 also can include one or more social networking services 1022. The social networking services 1022 can include various social networking services including, but not limited to, services for sharing or posting status updates, instant messages, links, photos, videos, and/or other information; services for commenting or displaying interest in articles, products, blogs, or other resources; and/or other services. In some configurations, the social networking services 1022 are provided by or include the FACEBOOK® social networking service, the LINKEDIN® professional networking service, the MYSPACE® social networking service, the FOURSQUARE® geographic networking service, the YAMMER® office colleague networking service, and the like. In other configurations, the social networking services 1022 are provided by other services, sites, and/or providers that may or may not be explicitly known as social networking providers. For example, some web sites allow users to interact with one another via email, chat services, and/or other means during various activities and/or contexts such as reading published articles, commenting on goods or services, publishing, collaboration, gaming, and the like. Examples of such services include, but are not limited to, the WINDOWS LIVE® service and the XBOX LIVE® service from Microsoft Corporation in Redmond, Wash. Other services are possible and are contemplated.

The social networking services 1022 also can include commenting, blogging, and/or micro blogging services. Examples of such services include, but are not limited to, the YELP® commenting service, the KUDZU® review service, the OFFICETALK® enterprise micro blogging service, the TWITTER® messaging service, the GOOGLE BUZZ® service, and/or other services. It should be appreciated that the above lists of services are not exhaustive and that numerous additional and/or alternative social networking services 1022 are not mentioned herein for the sake of brevity. As such, the above configurations are illustrative, and should not be construed as being limited in any way. According to various implementations, the social networking services 1022 can host one or more applications and/or software modules for providing functionality for contextually-aware location sharing services for computing devices. For instance, a social networking application, mail client, messaging client, a browser running on a phone or any other client 1006 can communicate with a social networking service 1022.

As shown in FIG. 10, the application servers 1008 also can host other services, applications, portals, and/or other resources ("other resources") 1024. The other resources 1024 can deploy a service-oriented architecture or any other client-server management software. It thus can be appreciated that the computing environment 1002 can provide integration of the selection concepts and technologies described herein with various mailbox, messaging, social networking, and/or other services or resources.

As mentioned above, the computing environment 1002 can include the data storage 1010. According to various implementations, the functionality of the data storage 1010 is provided by one or more databases operating on, or in communication with, the network 1004. The functionality of the data storage 1010 also can be provided by one or more server computers configured to host data for the computing environment 1002. The data storage 1010 can include, host, or provide one or more real or virtual containers 1026A-1026N (referred to collectively and/or generically as "containers 1026"). Although not illustrated in FIG. 10, the containers 1026 also can host or store data structures and/or algorithms for execution by one or more modules of remote computing devices (e.g., selection module 116 of one of computing devices 102, or selection module 416 or sensor data collection module(s) 414 of computing device 400). Aspects of the containers 1026 can be associated with a database program, file system and/or any program that stores data with secure access features. Aspects of the containers 1026 can also be implemented using products or services, such as ACTIVE DIRECTORY®, DKM®, ONEDRIVE®, DROPBOX® or GOOGLEDRIVE®.

The computing environment 1002 can communicate with, or be accessed by, the network interfaces 1012. The network interfaces 1012 can include various types of network hardware and software for supporting communications between two or more computing entities including, but not limited to, the clients 1006 and the application servers 1008. It should be appreciated that the network interfaces 1012 also can be utilized to connect to other types of networks and/or computer systems.

It should be understood that the distributed computing environment 1000 described herein can provide any aspects of the software elements described herein with any number of virtual computing resources and/or other distributed computing functionality that can be configured to execute any aspects of the software components described herein. According to various implementations of the concepts and technologies described herein, the distributed computing environment 1000 provides the software functionality described herein as a service to the clients 1006. It should be understood that the clients 1006 can include real or virtual machines including, but not limited to, server computers, web servers, personal computers, tablet computers, gaming consoles, smart televisions, mobile computing entities, smart phones, and/or other devices. As such, various configurations of the concepts and technologies described herein enable any device configured to access the distributed computing environment 1000 to utilize the functionality described herein for providing selection techniques, among other aspects. In one specific example, as summarized above, techniques described herein can be implemented, at least in part, by a web browser application that can work in conjunction with the application servers 1008 of FIG. 10.

Figure 11:
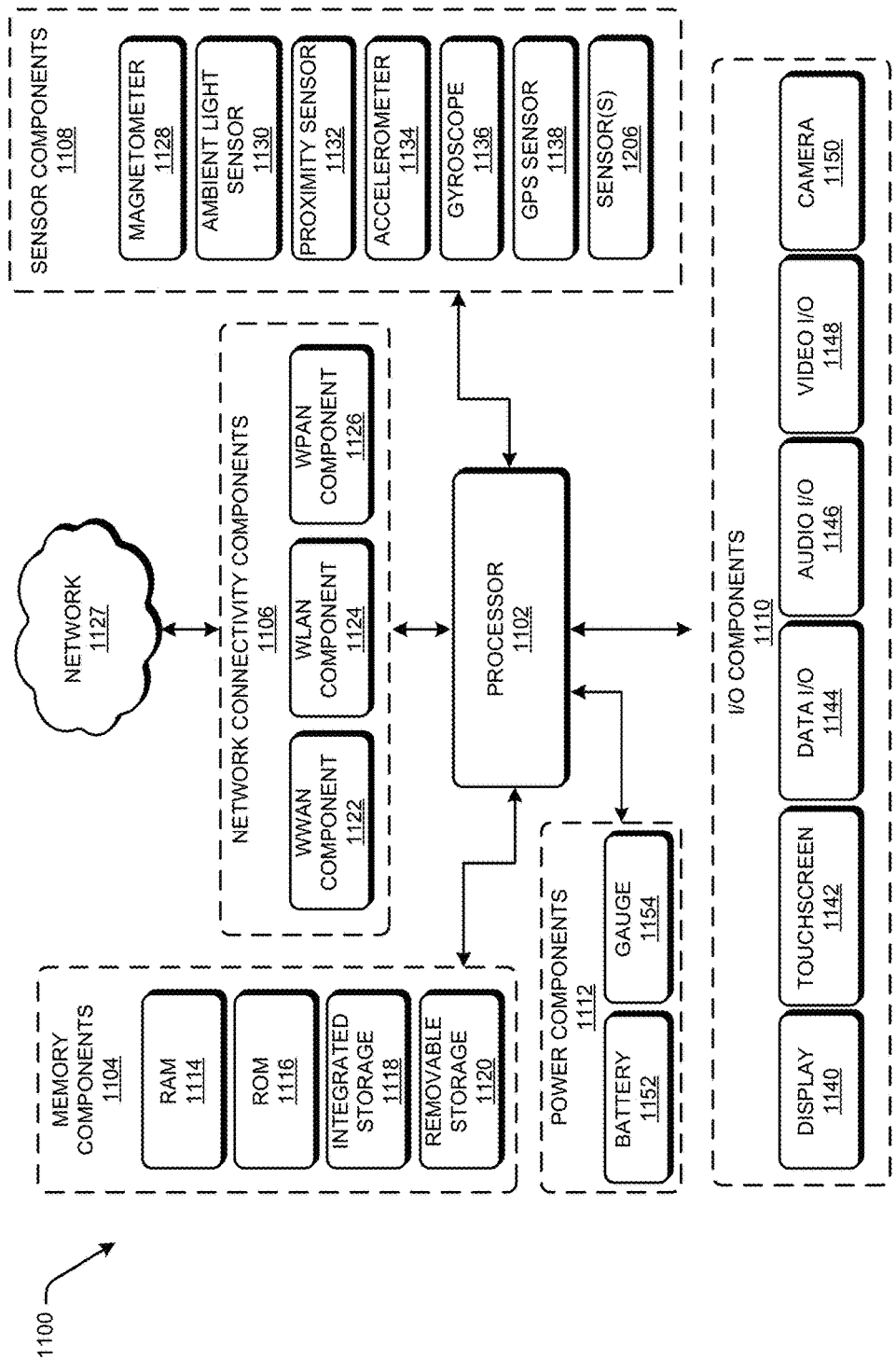
FIG. 11 is a schematic diagram illustrating another example computing device architecture usable to implement aspects of selecting objects.

FIG. 11 is an illustrative computing device architecture 1100 for a computing device that is capable of executing various software components described which, in some examples, is usable to implement aspects of selecting objects in a scene. The computing device architecture 1100 is applicable to computing entities that facilitate mobile computing due, in part, to form factor, wireless connectivity, and/or battery-powered operation. In some configurations, the computing entities include, but are not limited to, mobile telephones, tablet devices, slate devices, wearable devices, portable video game devices, and the like. Moreover, aspects of the computing device architecture 1100 can be applicable to traditional desktop computers, portable computers (e.g., laptops, notebooks, ultra-portables, and netbooks), server computers, and other computer systems. By way of example and not limitation, the computing device architecture 1100 is applicable to any of the clients shown in FIGS. 1, 4, 5, 9, and 10 (e.g., computing devices 102, computing device 400, device 500, and/or devices 1006).

The computing device architecture 1100 illustrated in FIG. 11 includes a processor 1102, memory components 1104, network connectivity components 1106, sensor components 1108, input/output components 1110, and power components 1112. In the illustrated configuration, the processor 1102 is in communication with the memory components 1104, the network connectivity components 1106, the sensor components 1108, the input/output ("I/O") components 1110, and the power components 1112. Although no connections are shown between the individual components illustrated in FIG. 11, the components can interact to carry out device functions. In some configurations, the components are arranged so as to communicate via one or more busses (not shown).

The processor 1102 includes a central processing unit ("CPU") configured to process data, execute computer-executable instructions of one or more application programs, and communicate with other components of the computing device architecture 1100 in order to perform various functionality described herein. The processor 1102 can be utilized to execute aspects of the software components presented herein. In some examples, the processor 1102 can correspond to processor(s) 108, processor(s) 402, and/or CPU 902, as described above in reference to FIGS. 1, 4, and 9.

In some configurations, the processor 1102 includes a graphics processing unit ("GPU") configured to accelerate operations performed by the CPU, including, but not limited to, operations performed by executing general-purpose scientific and/or engineering computing applications, as well as graphics-intensive computing applications such as high resolution video (e.g., 1080i, 1080p, and higher resolution), video games, three-dimensional ("3D") modeling applications, and the like. In some configurations, the processor 1102 is configured to communicate with a discrete GPU (not shown). In some examples, the processor 1102 may additionally or alternatively comprise a holographic processing unit (HPU) which is designed specifically to process and integrate data from multiple sensors of a head mounted computing device and to handle tasks such as spatial mapping, gesture recognition, and voice and speech recognition. In any case, the CPU, GPU, and/or HPU can be configured in accordance with a co-processing CPU/GPU/HPU computing model, wherein processing tasks are divided between the CPU, GPU, and/or HPU according to their respective strengths. For instance, the sequential part of an application may execute on the CPU, the computationally-intensive part is accelerated by the GPU, and certain specialized functions (e.g., spatial mapping, gesture recognition, and voice and speech recognition) may executed by an HPU.

In some configurations, the processor 1102 is, or is included in, a System-on-Chip ("SoC") along with one or more of the other components described herein below. For example, the SoC can include the processor 1102, a GPU, one or more of the network connectivity components 1106, and one or more of the sensor components 1108. In some configurations, the processor 1102 is fabricated, in part, utilizing a Package-on-Package ("PoP") integrated circuit packaging technique. The processor 1102 can be a single core or multi-core processor.

The processor 1102 can be created in accordance with an ARM architecture, available for license from ARM HOLDINGS of Cambridge, United Kingdom. Alternatively, the processor 1102 can be created in accordance with an x86 architecture, such as is available from INTEL CORPORATION of Mountain View, Calif. and others. In some configurations, the processor 1102 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 1104 include a random access memory ("RAM") 1114, a read-only memory ("ROM") 1116, an integrated storage memory ("integrated storage") 1118, and a removable storage memory ("removable storage") 1120. In some configurations, the RAM 1114 or a portion thereof, the ROM 1116 or a portion thereof, and/or some combination the RAM 1114 and the ROM 1116 is integrated in the processor 1102. In some configurations, the ROM 1116 is configured to store a firmware, an operating system or a portion thereof (e.g., operating system kernel), and/or a bootloader to load an operating system kernel from the integrated storage 1118 and/or the removable storage 1120. In some examples, memory components 1104 can correspond to computer-readable media 110, computer-readable media 404, memory 904, as described above in reference to FIGS. 1, 4, and 9, respectively.

The integrated storage 1118 can include a solid-state memory, a hard disk, or a combination of solid-state memory and a hard disk. The integrated storage 1118 can be soldered or otherwise connected to a logic board upon which the processor 1102 and other components described herein also can be connected. As such, the integrated storage 1118 is integrated in the computing device. The integrated storage 1118 is configured to store an operating system or portions thereof, application programs, data, and other software components described herein.

The removable storage 1120 can include a solid-state memory, a hard disk, or a combination of solid-state memory and a hard disk. In some configurations, the removable storage 1120 is provided in lieu of the integrated storage 1118. In other configurations, the removable storage 1120 is provided as additional optional storage. In some configurations, the removable storage 1120 is logically combined with the integrated storage 1118 such that the total available storage is made available as a total combined storage capacity. In some configurations, the total combined capacity of the integrated storage 1118 and the removable storage 1120 is shown to a user instead of separate storage capacities for the integrated storage 1118 and the removable storage 1120.

The removable storage 1120 is configured to be inserted into a removable storage memory slot (not shown) or other mechanism by which the removable storage 1120 is inserted and secured to facilitate a connection over which the removable storage 1120 can communicate with other components of the computing device, such as the processor 1102. The removable storage 1120 can be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 1104 can store an operating system. According to various configurations, the operating system includes, but is not limited to, SYMBIAN OS from SYMBIAN LIMITED, WINDOWS MOBILE OS from Microsoft Corporation of Redmond, Wash., WINDOWS PHONE OS from Microsoft Corporation, WINDOWS from Microsoft Corporation, PALM WEBOS from Hewlett-Packard Company of Palo Alto, Calif., BLACKBERRY OS from Research In Motion Limited of Waterloo, Ontario, Canada, IOS from Apple Inc. of Cupertino, Calif., and ANDROID OS from Google Inc. of Mountain View, Calif. Other operating systems are also contemplated.

The network connectivity components 1106 include a wireless wide area network component ("WWAN component") 1122, a wireless local area network component ("WLAN component") 1124, and a wireless personal area network component ("WPAN component") 1126. The network connectivity components 1106 facilitate communications to and from the network 1127 or another network, which can be a WWAN, a WLAN, or a WPAN. Although only the network 1127 is illustrated, the network connectivity components 1106 can facilitate communication with multiple networks, including the network 1127 of FIG. 11. For example, the network connectivity components 1106 can facilitate communications with multiple networks via one or more of a WWAN, a WLAN, or a WPAN. In some examples, the network 1127 can correspond to all or part of, network 932 and/or network 1004, as shown in FIG. 9 and FIG. 10.

The network 1127 can be or can include a WWAN, such as a mobile telecommunications network utilizing one or more mobile telecommunications technologies to provide voice and/or data services to a computing device utilizing the computing device architecture 1100 via the WWAN component 1122. The mobile telecommunications technologies can include, but are not limited to, Global System for Mobile communications ("GSM"), Code Division Multiple Access ("CDMA") ONE, CDMA2000, Universal Mobile Telecommunications System ("UMTS"), Long Term Evolution ("LTE"), and Worldwide Interoperability for Microwave Access ("WiMAX"). Moreover, the network 1127 can utilize various channel access methods (which can or cannot be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications can be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 1127 can be configured to provide voice and/or data communications with any combination of the above technologies. The network 1127 can be configured to or adapted to provide voice and/or data communications in accordance with future generation technologies.

In some configurations, the WWAN component 1122 is configured to provide dual-multi-mode connectivity to the network 1127. For example, the WWAN component 1122 can be configured to provide connectivity to the network 1127, wherein the network 1127 provides service via GSM and UMTS technologies, or via some other combination of technologies. Alternatively, multiple WWAN components 1122 can be utilized to perform such functionality, and/or provide additional functionality to support other non-compatible technologies (i.e., incapable of being supported by a single WWAN component). The WWAN component 1122 can facilitate similar connectivity to multiple networks (e.g., a UMTS network and an LTE network).

The network 1127 can be a WLAN operating in accordance with one or more Institute of Electrical and Electronic Engineers ("IEEE") 802.15 standards, such as IEEE 802.15a, 802.15b, 802.15g, 802.15n, and/or future 802.15 standard (referred to herein collectively as WI-FI). Draft 802.15 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 1124 is configured to connect to the network 1127 via the WI-FI access points. Such connections can be secured via various encryption technologies including, but not limited, WI-FI Protected Access ("WPA"), WPA2, Wired Equivalent Privacy ("WEP"), and the like.

The network 1127 can be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 1126 is configured to facilitate communications with other devices, such as peripherals, computers, or other computing entities via the WPAN.

In at least one example, the sensor components 1108 can include a magnetometer 1128, an ambient light sensor 1130, a proximity sensor 1132, an accelerometer 1134, a gyroscope 1136, and a Global Positioning System sensor ("GPS sensor") 1138. Additionally, the sensor components 1108 can include any or all of the sensor(s) 406 as described above with reference to FIG. 4. It is contemplated that other sensors, such as, but not limited to, temperature sensors or shock detection sensors, strain sensors, moisture sensors also can be incorporated in the computing device architecture 1100.

The magnetometer 1128 is configured to measure the strength and direction of a magnetic field. In some configurations the magnetometer 1128 provides measurements to a compass application program stored within one of the memory components 1104 in order to provide a user with accurate directions in a frame of reference including the cardinal directions, north, south, east, and west. Similar measurements can be provided to a navigation application program that includes a compass component. Other uses of measurements obtained by the magnetometer 1128 are contemplated.

The ambient light sensor 1130 is configured to measure ambient light. In some configurations, the ambient light sensor 1130 provides measurements to an application program stored within one the memory components 1104 in order to automatically adjust the brightness of a display (described below) to compensate for low-light and high-light environments. Other uses of measurements obtained by the ambient light sensor 1130 are contemplated.

The proximity sensor 1132 is configured to detect the presence of an object or thing in proximity to the computing device without direct contact. In some configurations, the proximity sensor 1132 detects the presence of a user's body (e.g., the user's face) and provides this information to an application program stored within one of the memory components 1104 that utilizes the proximity information to enable or disable some functionality of the computing device. For example, a telephone application program can automatically disable a touchscreen (described below) in response to receiving the proximity information so that the user's face does not inadvertently end a call or enable/disable other functionality within the telephone application program during the call. Other uses of proximity as detected by the proximity sensor 1128 are contemplated.

The accelerometer 1134 is configured to measure proper acceleration. In some configurations, output from the accelerometer 1134 is used by an application program as an input mechanism to control some functionality of the application program. For example, the application program can be a video game in which a character, a portion thereof, or an object is moved or otherwise manipulated in response to input received via the accelerometer 1134. In some configurations, output from the accelerometer 1134 is provided to an application program for use in switching between landscape and portrait modes, calculating coordinate acceleration, or detecting a fall. Other uses of the accelerometer 1134 are contemplated.

The gyroscope 1136 is configured to measure and maintain orientation. In some configurations, output from the gyroscope 1136 is used by an application program as an input mechanism to control some functionality of the application program. For example, the gyroscope 1136 can be used for accurate recognition of movement within a 3D scene of a video game application or some other application. In some configurations, an application program utilizes output from the gyroscope 1136 and the accelerometer 1134 to enhance control of some functionality of the application program. Other uses of the gyroscope 1136 are contemplated.

The GPS sensor 1138 is configured to receive signals from GPS satellites for use in calculating a location. The location calculated by the GPS sensor 1138 can be used by any application program that requires or benefits from location information. For example, the location calculated by the GPS sensor 1138 can be used with a navigation application program to provide directions from the location to a destination or directions from the destination to the location. Moreover, the GPS sensor 1138 can be used to provide location information to an external location-based service, such as E1515 service. The GPS sensor 1138 can obtain location information generated via WI-FI, WIMAX, and/or cellular triangulation techniques utilizing one or more of the network connectivity components 1106 to aid the GPS sensor 1138 in obtaining a location fix. The GPS sensor 1138 can also be used in Assisted GPS ("A-GPS") systems.

In at least one example, the I/O components 1110 can correspond to the input interface(s) 408 and/or output interface(s) 410, described above with reference to FIG. 4. Additionally, or alternatively, the I/O components can include a display 1140, a touchscreen 1142, a data I/O interface component ("data I/O") 1144, an audio I/O interface component ("audio I/O") 1146, a video I/O interface component ("video I/O") 1148, and a camera 1150. In some configurations, the display 1140 and the touchscreen 1142 are combined. In some configurations two or more of the data I/O component 1144, the audio I/O component 1146, and the video I/O component 1148 are combined. The I/O components 1110 can include discrete processors configured to support the various interface described below, or can include processing functionality built-in to the processor 1102.

The display 1140 is an output device configured to present information in a visual form. In particular, the display 1140 can present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some configurations, the display 1140 is a liquid crystal display ("LCD") utilizing any active or passive matrix technology and any backlighting technology (if used). In some configurations, the display 1140 is an organic light emitting diode ("OLED") display. In some configurations, the display 1140 is a holographic display. Other display types are contemplated.

In at least one example, the display 1140 can correspond to the hardware display surface 422 and/or hardware display surface 502. As described above, the hardware display surface 422 and the hardware display surface 502 can be configured to graphically associate holographic user interfaces and other graphical elements with an object seen through the hardware display surface or rendered objects displayed on the hardware display surface. Additional features associated with the hardware display device 422 and the hardware display surface 502 are described above with reference to FIG. 4 and FIG. 5, respectively.

The touchscreen 1142, also referred to herein as a "touch-enabled screen," is an input device configured to detect the presence and location of a touch. The touchscreen 1142 can be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or can utilize any other touchscreen technology. In some configurations, the touchscreen 1142 is incorporated on top of the display 1140 as a transparent layer to enable a user to use one or more touches to interact with objects or other information presented on the display 1140. In other configurations, the touchscreen 1142 is a touch pad incorporated on a surface of the computing device that does not include the display 1140. For example, the computing device can have a touchscreen incorporated on top of the display 1140 and a touch pad on a surface opposite the display 1140.

In some configurations, the touchscreen 1142 is a single-touch touchscreen. In other configurations, the touchscreen 1142 is a multi-touch touchscreen. In some configurations, the touchscreen 1142 is configured to detect discrete touches, single touch gestures, and/or multi-touch gestures. These are collectively referred to herein as gestures for convenience. Several gestures will now be described. It should be understood that these gestures are illustrative and are not intended to limit the scope of the appended claims. Moreover, the described gestures, additional gestures, and/or alternative gestures can be implemented in software for use with the touchscreen 1142. As such, a developer can create gestures that are specific to a particular application program.

In some configurations, the touchscreen 1142 supports a tap gesture in which a user taps the touchscreen 1142 once on an item presented on the display 1140. The tap gesture can be used to perform various functions including, but not limited to, opening or launching whatever the user taps. In some configurations, the touchscreen 1142 supports a double tap gesture in which a user taps the touchscreen 1142 twice on an item presented on the display 1140. The double tap gesture can be used to perform various functions including, but not limited to, zooming in or zooming out in stages. In some configurations, the touchscreen 1142 supports a tap and hold gesture in which a user taps the touchscreen 1142 and maintains contact for at least a pre-defined time. The tap and hold gesture can be used to perform various functions including, but not limited to, opening a context-specific menu.

In some configurations, the touchscreen 1142 supports a pan gesture in which a user places a finger on the touchscreen 1142 and maintains contact with the touchscreen 1142 while moving the finger on the touchscreen 1142. The pan gesture can be used to perform various functions including, but not limited to, moving through screens, images, or menus at a controlled rate. Multiple finger pan gestures are also contemplated. In some configurations, the touchscreen 1142 supports a flick gesture in which a user swipes a finger in the direction the user wants the screen to move. The flick gesture can be used to perform various functions including, but not limited to, scrolling horizontally or vertically through menus or pages. In some configurations, the touchscreen 1142 supports a pinch and stretch gesture in which a user makes a pinching motion with two fingers (e.g., thumb and forefinger) on the touchscreen 1142 or moves the two fingers apart. The pinch and stretch gesture can be used to perform various functions including, but not limited to, zooming gradually in or out of a website, map, or picture.

Although the above gestures have been described with reference to the use of one or more fingers for performing the gestures, other appendages such as toes or objects such as styluses can be used to interact with the touchscreen 1142. As such, the above gestures should be understood as being illustrative and should not be construed as being limited in any way.

The data I/O interface component 1144 is configured to facilitate input of data to the computing device and output of data from the computing device. In some configurations, the data I/O interface component 1144 includes a connector configured to provide wired connectivity between the computing device and a computer system, for example, for synchronization operation purposes. The connector can be a proprietary connector or a standardized connector such as USB, micro-USB, mini-USB, or the like. In some configurations, the connector is a dock connector for docking the computing device with another device such as a docking station, audio device (e.g., a digital music player), or video device.

The audio I/O interface component 1146 is configured to provide audio input and/or output capabilities to the computing device. In some configurations, the audio I/O interface component 1146 includes a microphone configured to collect audio signals. In some configurations, the audio I/O interface component 1146 includes a headphone jack configured to provide connectivity for headphones or other external speakers. In some configurations, the audio I/O interface component 1146 includes a speaker for the output of audio signals. In some configurations, the audio I/O interface component 1146 includes an optical audio cable out.

The video I/O interface component 1148 is configured to provide video input and/or output capabilities to the computing device. In some configurations, the video I/O interface component 1148 includes a video connector configured to receive video as input from another device (e.g., a video media player such as a DVD or BLURAY player) or send video as output to another device (e.g., a monitor, a television, or some other external display). In some configurations, the video I/O interface component 1148 includes a High-Definition Multimedia Interface ("HDMI"), mini-HDMI, micro-HDMI, DisplayPort, or proprietary connector to input/output video content. In some configurations, the video I/O interface component 1148 or portions thereof is combined with the audio I/O interface component 1146 or portions thereof The camera 1150 can be configured to capture still images and/or video. The camera 1150 can utilize a charge coupled device ("CCD") or a complementary metal oxide semiconductor ("CMOS") image sensor to capture images. In some configurations, the camera 1150 includes a flash to aid in taking pictures in low-light environments. Settings for the camera 1150 can be implemented as hardware or software buttons. Images and/or video captured by camera 1150 may additionally or alternatively be used to detect non-touch gestures, facial expressions, eye movement, or other movements and/or characteristics of the user.

Although not illustrated, one or more hardware buttons can also be included in the computing device architecture 1100. The hardware buttons can be used for controlling some operational aspect of the computing device. The hardware buttons can be dedicated buttons or multi-use buttons. The hardware buttons can be mechanical or sensor-based.

The illustrated power components 1112 include one or more batteries 1152, which can be connected to a battery gauge 1154. The batteries 1152 can be rechargeable or disposable. Rechargeable battery types include, but are not limited to, lithium polymer, lithium ion, nickel cadmium, and nickel metal hydride. Each of the batteries 1152 can be made of one or more cells.

The battery gauge 1154 can be configured to measure battery parameters such as current, voltage, and temperature. In some configurations, the battery gauge 1154 is configured to measure the effect of a battery's discharge rate, temperature, age and other factors to predict remaining life within a certain percentage of error. In some configurations, the battery gauge 1154 provides measurements to an application program that is configured to utilize the measurements to present useful power management data to a user. Power management data can include one or more of a percentage of battery used, a percentage of battery remaining, a battery condition, a remaining time, a remaining capacity (e.g., in watt hours), a current draw, and a voltage.

The power components 1112 can also include a power connector, which can be combined with one or more of the aforementioned I/O components 1110. The power components 1112 can interface with an external power system or charging equipment via a power I/O component.

Example Selection Techniques

Figure 12:
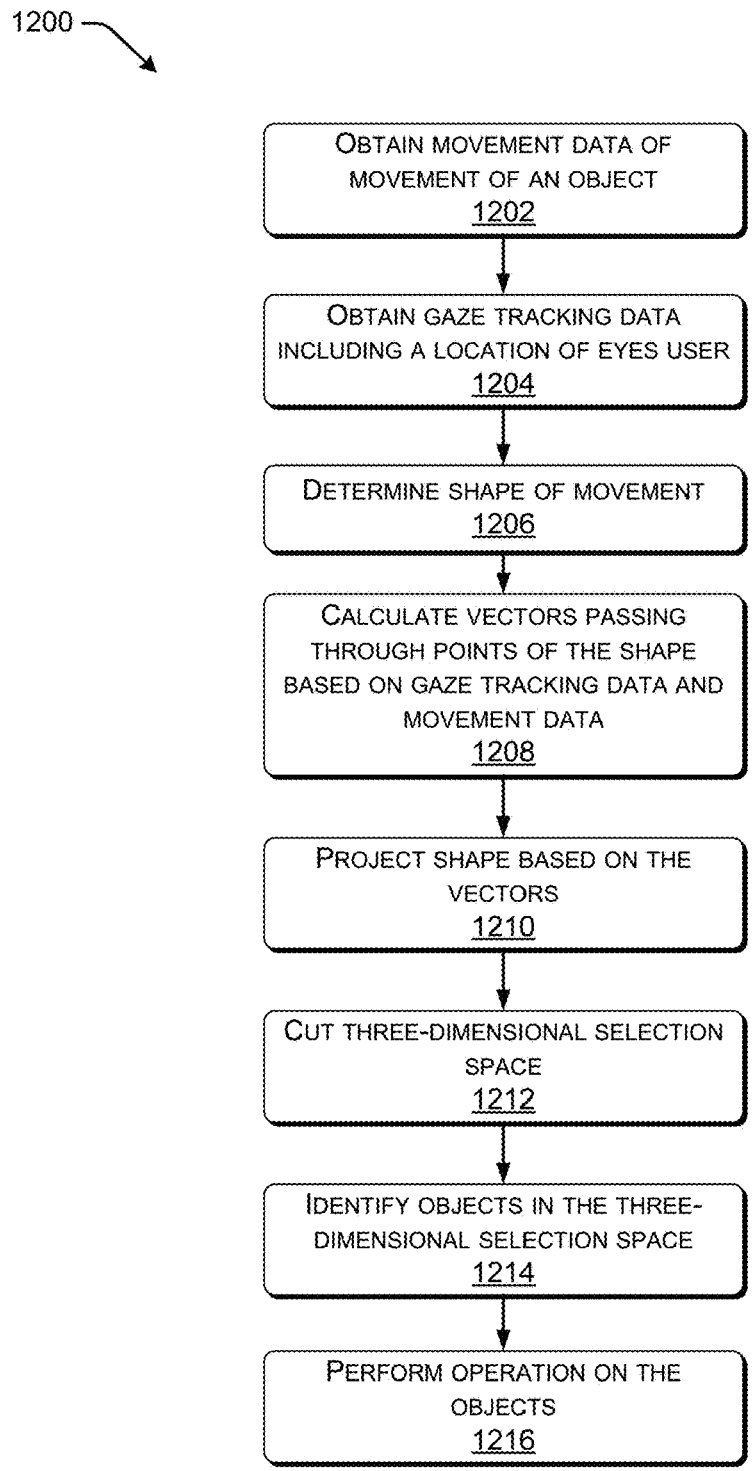
FIG. 12 is a flowchart illustrating aspects of an example process for creating a selection space for selecting objects in a three-dimensional scene.

FIG. 12 is a flowchart illustrating example selection techniques that can be implemented using one or more of the devices and/or computing architectures described herein. The techniques are described in the context of the environment 100 of FIG. 1 for convenience, but the techniques are not limited to use in the environment or with the devices shown in FIG. 1. Rather the techniques of FIG. 12 are applicable to other environments and devices including those shown in FIGS. 4, 5, 9, 10, and 11, as well as other environments and computing devices.

The process described below with reference to FIG. 12 is illustrated as a collection of blocks in logical flow graphs, which represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

FIG. 12 illustrates an example process 1200 to implement selection techniques in three-dimensional scenes (e.g., computer generated scenes, virtual reality scenes, mixed reality scenes, etc.). Block 1202 illustrates a computing device (e.g., computing device 102) using one or more sensors (e.g., sensor(s) 112) to obtain movement data by tracking the movement of an input object in an environment that is controlled by a user. In some examples, obtaining the movement data may include detecting a starting action (e.g., pressing a button, hand gesture, voice command, etc.) performed by the user which indicates the user wishes to interact with multiple objects in the scene. The computing device 102 may further use the sensor(s) 112 to track the movement of the input object subsequent to the starting action until the movement stops, or until an ending action is detected.

At block 1204, the computing device 102 may use the sensor(s) 112 to obtain gaze tracking data including a location of eyes of a user. The gaze tracking data may be obtained from a gaze tracking environmental camera of the computing device (e.g., sensor(s) 112 or gaze tracking camera 406A), or other sensor(s) 112 and 406 (e.g., accelerometer, proximity sensor, magnetic field sensor, etc.). In some examples, the gaze tracking data may be obtained responsive to detecting the starting action and/or the start of the movement detected by the sensors(s) 112.

At block 1206, the computing device may use one or more modules (e.g., selection module 116) to determine a shape associated with the movement. For example, the selection module 116 may determine that the movement data includes a diagonal line movement. In some examples, the selection module 116 may define, or calculate, a rectangle that has a diagonal corresponding to the diagonal line movement included in the movement data.

At block 1208, the selection module 116 may calculate vectors based on the movement data and the gaze tracking data. For example, the selection module 116 may calculate vectors which originate at a location near or at an eye of the user and pass through points along the shape of the movement included in the movement data.

At block 1210, the selection module 116 may use the vectors to extend and/or expand a virtual representation of the shape defined by the movement of the input object in a direction substantially parallel to a vector which extends from a location near or at the eyes of the user to a point at or near the shape, such as a center of the shape, to create a virtual 3D volume in the scene. In some examples, the vectors may be extended for an infinite distance.

At block 1212, the selection module 116 may cut or bound the 3D volume with a plane perpendicular to the gaze of the user at a maximum distance (i.e., far boundary) and/or minimum distance (i.e., far boundary) from the user to create a finite 3D volume (e.g., cone, frustum, cylinder, etc.) The maximum distance and/or minimum distance may be predetermined distances, or distances calculated based on various actions of the user (e.g., movement of the input object, movement of another arm of the user, movement of the user's body, etc.). In this way, the selection module 116 may create a finite 3D selection space.

At block 1214, the selection module 116 may identify one or more objects within, or at least partially within, the 3D selection space. For example, the selection module 116 may access data obtained by an environment camera to determine which objects in the scene fall in or at least partially in the 3D selection space.

At block 1216, the selection module 116 may perform one or more operations on the objects included in the 3D selection space. For example, the selection module 116 may select the objects and/or present visual indicators (e.g., dotted line, highlight, color, etc.) to indicate that the objects have been selected. In some examples, the selection module 116 may additionally, or alternatively, cause an operation to be performed on the objects included in the 3D selection space (e.g., moving, resizing, coloring, etc.).

Example Clauses

The disclosure presented herein can be considered in view of the following clauses.

A. In some examples, a system comprises: a display to present a scene, the scene comprising at least one virtual object; one or more sensors to capture data from a real world environment; one or more processors communicatively coupled to the one or more sensors and the display; and memory having computer-executable instructions stored thereupon which, when executed by the one or more processors, cause the computing device to perform operations comprising: obtaining, from the one or more sensors, movement data corresponding to a movement of an input object in the real world environment of a user; obtaining, from the one or more sensors, gaze tracking data including a location of the eyes of the user in the real world environment; determining, based at least in part on the movement data and the gaze tracking data, a three-dimensional (3D) selection space in the scene; identifying one or more objects in the scene located in or at least partially in the 3D selection space, the objects including at least one of a physical object in the environment or the at least one virtual object; and performing an operation on the one or more objects.

B. The system of paragraph A, wherein the scene comprises one of: a mixed reality scene including the real world environment and at least one of the physical object or the at least one virtual object; or a virtual reality scene including the at least one virtual object and excluding the real world environment.

C. The system of paragraph A or B, the obtaining the movement data comprising: detecting, by the one or more sensors, a starting action; detecting, by the one or more sensors, an ending action; and identifying a shape corresponding to the movement of the input object detected between the starting action and the ending action.

D. The system of any of paragraphs A-C, the determining the 3D selection space in the scene comprising: identifying a first location and a second location along a shape defined by the movement of the input object; calculating a first vector originating from a location at or near an eye of the user and intersecting the first location along the shape; calculating a second vector originating from the location at or near the eye of the user and intersecting the second location along the shape; and extending the first vector and the second vector in a direction substantially parallel to a third vector which extends from the location near or at the eyes of the user to a location at or near the shape.

E. The system of paragraph D, the determining the 3D selection space in the scene further comprising: determining a distance from the eye of the user to the selection space to create a near boundary by cutting the 3D selection space; and creating a finite 3D selection space by bounding the 3D selection space at the near boundary, the bounding comprising cutting the 3D selection space with a plane perpendicular to the third vector at the distance.

F. The system of paragraph D, the determining the 3D selection space in the scene further comprising: determining a distance from the user to the selection space to create a far boundary by preventing the 3D selection space from extending further than the far boundary; and creating a finite 3D selection space by bounding the 3D selection space at the far boundary, the bounding comprising cutting the 3D selection space with a plane perpendicular to the third vector at the distance.

G. The system of paragraph F, the determining the distance from the eye of the user to the selection space to create the far boundary comprising at least one of: identifying a predetermined maximum distance; or analyzing the movement data to identify another movement of at least one of the input object or a body part of the user in the direction parallel to the third vector; and applying a scaling factor to the other movement to determine the at least one of the maximum distance or the minimum distance.

H. The system of any of paragraphs A-G, wherein the one or more sensors comprise at least one of: an accelerometer; a user-facing environmental camera; an outwardly facing environmental camera; a gaze tracking camera; a proximity sensor; or a magnetic field sensor.

I. The system of any of paragraphs A-H, wherein the movement of the input object in the environment comprises at least one of a linear movement or a free form movement.

J. The system of any of paragraphs A-I, wherein the input object comprises at least one of a controller or a body part of the user.

K. The system of any of paragraphs A-J, the performing the operation on the one or more objects including: selecting the one or more objects; and visually indicating that the one or more objects are selected by virtually associating an indicator with the one or more objects.

L. In some examples, a computer-implemented method comprises: obtaining, from one or more sensors, movement data corresponding to a movement of an input object in a real world environment; obtaining, from the one or more sensors, gaze tracking data including a location of eyes of a user in the environment; presenting, on a display, a scene comprising at least one virtual object; calculating, based at least in part on the gaze tracking data and the movement data, multiple vectors, each of the multiple vectors originating at or near an eye of the user and passing through a location along a shape defined by the movement of the input object; extending the vectors in a direction substantially parallel to a reference vector extending from a location at or near the eye of the user to a location at or near the shape to define a three-dimensional (3D) volume in the scene; identifying one or more objects in the scene included in or at least partially in the 3D volume, the one or more objects including at least one of a physical object in the real world environment or the at least one virtual object; and performing an operation on the one or more objects included in or at least partially in the 3D volume.

M. The computer-implemented method of paragraph L, wherein the scene comprises one of a mixed reality scene including the real world environment and at least one of the physical object or the at least one virtual object, or a virtual reality scene including the at least one virtual object and excluding the real world environment.

N. The computer-implemented method of paragraph L or M, the obtaining the movement data comprising: detecting, by the one or more sensors, a starting action of the input object; detecting, by the one or more sensors, an ending action of the input object; and capturing the movement of the input object detected between the starting action and the ending action.

O. The computer-implemented method of any of paragraphs L-N, further comprising: determining a distance from the user to the selection space to create a near boundary at which to bound the 3D volume; and bounding the 3D volume at the near boundary by cutting the 3D volume with a plane perpendicular to the reference vector at the distance.

P. The computer-implemented method of any of paragraphs L-O, further comprising: determining a distance from the user to the selection space to create a far boundary at which to bound the 3D volume by preventing the 3D selection space from extending further than the far boundary; and bounding the 3D volume at the far boundary by cutting the 3D volume with a plane substantially perpendicular to the reference vector at the distance.

Q. The computer-implemented method of paragraph P, the determining the distance comprising at least one of: identifying a predetermined maximum distance; or analyzing the movement data to identify another movement of a second input object in the direction substantially parallel to the reference vector, the second input object comprising at least one of the input object, an arm of the user, or a body of the user; and applying a scaling factor to the other movement to determine the distance.

R. The computer-implemented method of any of paragraphs L-Q, wherein the 3D volume comprises a geometric shape defined by: a front planar surface substantially perpendicular to reference vector and having a boundary defined by the movement of the input object; a rear planar surface spaced apart from and parallel to the front planar surface, the rear planar surface having a boundary that is geometrically similar in shape to the boundary of the front planar surface; and a side wall extending from the front planar surface to the rear planar surface and extending around the boundaries of the front planar surface and the rear planar surface.

S. The computer-implemented method of any of paragraphs L-R, the extending the vectors along the direction substantially parallel to the reference vector to define the 3D volume comprising presenting a virtual representation of the 3D volume on a display of a computing device associated with the user.

T. The computer-implemented method of any of paragraphs L-S, wherein the one or more sensors comprise at least one of: an accelerometer; a user-facing environmental camera; an outwardly facing environmental camera; a gaze tracking camera; a proximity sensor; or a magnetic field sensor.

U. In some examples, a wearable computing device comprises: one or more sensors to obtain data from an environment, the environment comprising at least one of a virtual reality environment or a mixed reality environment; one or more processors communicatively coupled to the one or more sensors; and memory having computer-executable instructions stored thereupon which, when executed by the one or more processors, cause the computing device to perform operations comprising: obtaining, from the one or more sensors, movement data corresponding to a movement of an input object in the environment; obtaining, from the one or more sensors, gaze tracking data corresponding to a location of eyes of the user; analyzing the movement data to calculate a rectangle shape defined by the movement of the input object; calculating vectors originating at a location near or at an eye of the user and intersecting with points along the rectangle shape; extending the vectors in a direction substantially parallel to a reference vector which extends from the location near or at the eye of the user to a location at or near the rectangle shape to create a pyramid shape; identifying one or more objects included in or partially included in the pyramid shape; and selecting the one or more objects included in or partially included in the pyramid shape, the one or more objects including at least one of a physical object or a virtual object.

V. The wearable computing device of paragraph U, the operations further comprising: determining a distance from the user to the pyramid shape to create a near boundary by cutting the pyramid shape; creating a frustum of the pyramid shape by bounding the pyramid shape at the near boundary, the bounding comprising cutting the pyramid shape with a plane substantially perpendicular to the reference vector at the near boundary.

W. The wearable computing device of paragraph U or V, the analyzing the movement data to calculate the rectangle shape defined by the movement of the input object comprising: analyzing the movement data to determine the movement of the input object comprises a diagonal line; and calculating the rectangle shape having a diagonal corresponding to the diagonal line.

X. The wearable computing device of any of paragraphs U-W, the selecting the one or more objects included in or partially in the pyramid shape including: visually indicating that the one or more objects included in or partially included in the pyramid shape are selected by virtually associated an indicator with each of the one or more objects.

Y. The wearable computing device any of paragraphs U-X, the operations further comprising: obtaining, from one or more sensors, additional input from the user; and performing an action on the one or more selected objects based at least in part on the additional input.

Z. The wearable computing device any of paragraphs U-Y, wherein the one or more sensors comprise at least one of: an accelerometer; a user-facing environmental camera; an outwardly facing environmental camera; a gaze tracking camera; a proximity sensor; or a magnetic field sensor.

AA. One or more computer-readable media encoded with instructions that, when executed by one or more processors, configure a computing to perform a computer-implemented method as any of paragraphs L-T recite.

BB. A device comprising one or more processors, one or more sensors, and one or more computer-readable media encoded with instructions that, when executed by the one or more processors, configure a computer to perform a computer-implemented method as any of paragraphs L-T recite.

CC. A computer-implemented method comprising: means for obtaining movement data corresponding to a movement of an input object in an environment; means for obtaining gaze tracking data including a location of eyes of the user; means for determining, based at least in part on the movement data and the gaze tracking data, a three-dimensional (3D) selection space in a scene; means for identifying one or more objects in the scene located in or partially included in the 3D selection space, the objects including at least one of a physical object in the environment or the at least one virtual object; and means for performing an operation on the one or more objects.

Although the subject matter has been described in language specific to structural features and/or methodological acts, it is to be understood that the subject matter defined in the appended claims is not necessarily limited to the specific features or acts described. Rather, the specific features and acts are described as illustrative forms of implementing the claims.

Conditional language such as, among others, "can," "could," "might" or "can," unless specifically stated otherwise, are understood within the context to present that certain examples include, while other examples do not necessarily include, certain features, elements and/or steps. Thus, such conditional language is not generally intended to imply that certain features, elements and/or steps are in any way required for one or more examples or that one or more examples necessarily include logic for deciding, with or without input or prompting, whether certain features, elements and/or steps are included or are to be performed in any particular example. Conjunctive language such as the phrase "at least one of X, Y or Z," unless specifically stated otherwise, is to be understood to present that an item, term, etc. can be either X, Y, or Z, or a combination thereof.

What is claimed is:
1. A system comprising:
a display to present a scene, the scene comprising at least one virtual object;

one or more sensors to capture data from a real world environment of a user;

one or more processors communicatively coupled to the one or more sensors and the display; and memory having computer-executable instructions stored thereupon which, when executed by the one or more processors, cause the computing device to perform operations comprising:

detecting, by the one or more sensors, a starting action;

obtaining, from the one or more sensors, movement data corresponding to a movement of an input object in the real world environment of the user;

detecting, by the one or more sensors, an ending action;

identifying a shape corresponding to the movement of the input object between the starting action and the ending action;

obtaining, from the one or more sensors, gaze tracking data including a location of the eyes of the user in the real world environment;

determining, based at least in part on the shape and the gaze tracking data, a three-dimensional (3D) selection space in the scene by:

identifying a first location and a second location along the shape;

calculating a first vector originating from a location at or near an eye of the user and intersecting the first location along the shape;

calculating a second vector originating from the location at or near the eye of the user and intersecting the second location along the shape; and extending the first vector and the second vector in a direction substantially parallel to a third vector which extends from the location near or at the eyes of the user to a location at or near the shape;

identifying one or more objects in the scene located in or at least partially in the 3D selection space, the objects including at least one of a physical object in the real world environment or the at least one virtual object; and performing an operation on the one or more objects.

2. The system of claim 1, wherein the scene comprises one of:

a mixed reality scene including the real world environment and at least one of the physical object or the at least one virtual object; or a virtual reality scene including the at least one virtual object and excluding the real world environment.

3. The system of claim 1, the determining the 3D selection space in the scene further comprising:

determining a distance from the eye of the user to the 3D selection space to create a near boundary by cutting the 3D selection space; and creating a finite 3D selection space by bounding the 3D selection space at the near boundary, the bounding comprising cutting the 3D selection space with a plane perpendicular to the third vector at the distance.

4. The system of claim 1, the determining the 3D selection space in the scene further comprising:

determining a distance from the user to the 3D selection space to create a far boundary by preventing the 3D selection space from extending further than the far boundary; and creating a finite 3D selection space by bounding the 3D selection space at the far boundary, the bounding comprising cutting the 3D selection space with a plane perpendicular to the third vector at the distance.

5. The system of claim 1, wherein the movement of the input object in the real world environment comprises at least one of a linear movement or a free form movement.

6. The system of claim 1, wherein the input object comprises at least one of a controller or a body part of the user.

7. The system of claim 1, the performing the operation on the one or more objects including:

selecting the one or more objects; and visually indicating that the one or more objects are selected by virtually associating an indicator with the one or more objects.

8. A computer-implemented method comprising:

obtaining, from one or more sensors, movement data corresponding to a movement of an input object in a real world environment;

obtaining, from the one or more sensors, gaze tracking data including a location of eyes of a user in the environment;

presenting, on a display of a computing device associated with the user, a scene comprising at least one virtual object;

calculating, based at least in part on the gaze tracking data and the movement data, multiple vectors, each of the multiple vectors originating at or near an eye of the user and passing through a location along a shape defined by the movement of the input object;

defining a three-dimensional (3D) volume in the scene by extending the multiple vectors in a direction substantially parallel to a reference vector extending from a location at or near the eye of the user to a location at or near the shape, the extending the multiple vectors in the direction substantially parallel to the reference vector to define the 3D volume comprising presenting a virtual representation of the 3D volume on the display of the computing device associated with the user;

identifying one or more objects in the scene included in or at least partially in the 3D volume, the one or more objects including at least one of a physical object in the real world environment or the at least one virtual object; and performing an operation on the one or more objects included in or at least partially in the 3D volume.

9. The computer-implemented method of claim 8, wherein the scene comprises one of a mixed reality scene including the real world environment and at least one of the physical object or the at least one virtual object, or a virtual reality scene including the at least one virtual object and excluding the real world environment.

10. The computer-implemented method of claim 8, the obtaining the movement data comprising:

detecting, by the one or more sensors, a starting action of the input object;

detecting, by the one or more sensors, an ending action of the input object; and capturing the movement of the input object detected between the starting action and the ending action.

11. The computer-implemented method of claim 8, further comprising:

determining a distance from the user to the 3D volume to create a near boundary at which to bound the 3D volume; and bounding the 3D volume at the near boundary by cutting the 3D volume with a plane perpendicular to the reference vector at the distance.

12. The computer-implemented method of claim 8, further comprising:

determining a distance from the user to the 3D volume to create a far boundary at which to bound the 3D volume by preventing the 3D volume from extending further than the far boundary; and bounding the 3D volume at the far boundary by cutting the 3D volume with a plane substantially perpendicular to the reference vector at the distance.

13. The computer-implemented method of claim 8, wherein the 3D volume comprises a geometric shape defined by:

a front planar surface substantially perpendicular to the reference vector and having a boundary defined by the movement of the input object;

a rear planar surface spaced apart from and parallel to the front planar surface, the rear planar surface having a boundary that is geometrically similar in shape to the boundary of the front planar surface; and a side wall extending from the front planar surface to the rear planar surface and extending around the boundaries of the front planar surface and the rear planar surface.

14. A wearable computing device comprising:

one or more sensors to obtain data from an environment, the environment comprising at least one of a virtual reality environment or a mixed reality environment;

one or more processors communicatively coupled to the one or more sensors; and memory having computer-executable instructions stored thereupon which, when executed by the one or more processors, cause the computing device to perform operations comprising:

obtaining, from the one or more sensors, movement data corresponding to a movement of an input object in the environment;

obtaining, from the one or more sensors, gaze tracking data corresponding to a location of eyes of a user;

analyzing the movement data to calculate a shape defined by the movement of the input object;

calculating vectors originating at a location near or at an eye of the user and intersecting with points along the shape;

extending the vectors in a direction substantially parallel to a reference vector which extends from the location near or at the eye of the user to a location at or near the shape to create a three-dimensional (3D) volume;

identifying one or more objects included in or partially included in the 3D volume; and selecting the one or more objects included in or partially included in the 3D volume, the one or more objects including at least one of a physical object or a virtual object.

15. The wearable computing device of claim 14, the operations further comprising:

determining a distance from the user to the 3D volume to create a near boundary by cutting the 3D volume;

creating a frustum of the 3D volume by bounding the 3D volume at the near boundary, the bounding comprising cutting the 3D volume with a plane substantially perpendicular to the reference vector at the near boundary.

16. The wearable computing device of claim 14, the analyzing the movement data to calculate the shape defined by the movement of the input object comprising:

analyzing the movement data to determine the movement of the input object comprises a diagonal line; and calculating the shape having a diagonal corresponding to the diagonal line.

17. The wearable computing device of claim 14, the selecting the one or more objects included in or partially in the 3D volume including:

visually indicating that the one or more objects included in or partially included in the 3D volume are selected by virtually associated an indicator with each of the one or more objects.

* * * * *